United States Patent
Dolinski et al.

(10) Patent No.: US 10,148,072 B2
(45) Date of Patent: Dec. 4, 2018

(54) METHODS AND SYSTEMS FOR AUTONOMOUS REDUNDANT CONTROL

(71) Applicant: ASCO Power Technologies L.P., Florham Park, NJ (US)

(72) Inventors: Walter Dolinski, Sayreville, NJ (US); Donald K. Blackman, Denville, NJ (US); Victor E. Bonachea, Elmwood Park, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 325 days.

(21) Appl. No.: 15/046,142

(22) Filed: Feb. 17, 2016

(65) Prior Publication Data
US 2017/0237287 A1 Aug. 17, 2017

(51) Int. Cl.
*H02B 11/12* (2006.01)
*H01H 3/22* (2006.01)
*H02J 9/06* (2006.01)

(52) U.S. Cl.
CPC .............. *H02B 11/12* (2013.01); *H01H 3/22* (2013.01); *H02J 9/06* (2013.01)

(58) Field of Classification Search
None
See application file for complete search history.

(56) References Cited

U.S. PATENT DOCUMENTS

| | | | | |
|---|---|---|---|---|
| 9,829,960 B2* | 11/2017 | Pachoud | ............ | H02J 9/06 |
| 2010/0140061 A1* | 6/2010 | Gibbs | ............ | H01H 9/26 |
| | | | | 200/50.32 |
| 2011/0147173 A1* | 6/2011 | Lee | ............ | H02B 11/127 |
| | | | | 200/50.25 |
| 2012/0206861 A1* | 8/2012 | Beaver | ............ | H02B 11/02 |
| | | | | 361/608 |
| 2017/0117104 A1* | 4/2017 | Zhou | ............ | H01H 3/28 |

FOREIGN PATENT DOCUMENTS

CN       202285202 A  *  9/2014  ............... H02J 9/06

* cited by examiner

*Primary Examiner* — Jared Fureman
*Assistant Examiner* — James Evans
(74) *Attorney, Agent, or Firm* — McDonnell Boehnen Hulbert & Berhoff LLP

(57) ABSTRACT

An automatic autonomous redundant switch configured for providing energy from either a first power source or a second power source to a load is provided. The automatic switch includes a first automatic transfer switch (ATS) and a second ATS. The automatic switch further includes an interconnecting bus configured to connect the first ATS and the second ATS, and at least one controller configured to control the operation of the first ATS and the second ATS. Still further, the first ATS and the second ATS each include a respective transfer-switch mechanism, a respective bus attachment configured to connect to the interconnecting bus, and a respective motorized rack-out mechanism having a powered actuator.

14 Claims, 21 Drawing Sheets

METHODS AND SYSTEMS FOR AUTONOMOUS REDUNDANT CONTROL

BACKGROUND

Unless otherwise indicated herein, the materials described in this section are not prior art to the claims in this application and are not admitted to be prior art by inclusion in this section.

An automatic transfer switch (ATS) is designed to provide a continuous source of power for critical loads by automatically transferring from a normal power source to an emergency power source when one or more predetermined events occur (e.g., the normal power source falls below a preset limit). ATSs are in widespread use in, for example, airports, subways, schools, hospitals, military installations, industrial sites, and commercial buildings equipped with secondary power sources and where even brief power interruptions can be costly (or perhaps even life threatening). Transfer switches operate, for example, to transfer a power consuming load from a circuit with a normal power supply to a circuit with an auxiliary power supply. For instance, a transfer switch can control electrical connection of utility power lines and a diesel generator to facility load buses. In certain installations, the transfer switch automatically starts a standby generator and connects the standby generator to the load bus upon loss of utility power. In addition, the transfer switch can automatically reconnect the utility power to the load bus if utility power is reestablished.

ATSs are typically of two types: (i) an ATS comprised of a single fixed switching apparatus; and (ii) a removable main transfer switch interconnected with a redundant fixed bypass manual transfer switch. The second type is typically referred to as a "bypass-isolation transfer switch," and in this second type, the transfer switch includes a main transfer switch and a bypass feature. The bypass feature typically includes a secondary electro-mechanical switching device (bypass switch) that can route power to the load in a fashion which circumvents the main transfer switch. This bypass feature allows, for example, (i) switch redundancy if a problem arises with the main transfer switch, (ii) exercising the main transfer switch without a load connection, and (iii) isolation for maintenance of the main transfer switch while ensuring the continuity of power to the load or loads.

SUMMARY

In one example aspect, an automatic autonomous redundant switch configured to provide energy from either a first power source or a second power source to a load is provided. The automatic switch includes a first automatic transfer switch (ATS) and a second ATS. The automatic switch further includes an interconnecting bus configured to connect the first ATS and the second ATS, and at least one controller configured to control the operation of the first ATS and the second ATS. Still further, the first ATS and the second ATS each include: (i) a respective transfer-switch mechanism; (ii) a respective bus attachment configured to connect to the interconnecting bus; and (iii) a respective motorized rack-out mechanism having a powered actuator. The respective motorized rack-out mechanism is configured to move the respective transfer-switch mechanism between (i) a connected position in which the respective bus attachment is connected to the respective transfer-switch mechanism and (ii) an isolated position in which the respective bus attachment is isolated from the respective transfer-switch mechanism.

In another example, a single ATS is provided. The ATS includes a transfer-switch mechanism, a bus attachment, and a motorized rack-out mechanism having a powered actuator. The motorized rack-out mechanism is configured to move the transfer-switch mechanism between (i) a connected position in which the bus attachment is connected to the transfer-switch mechanism and (ii) an isolated position in which the bus attachment is isolated from the transfer-switch mechanism.

In another example, a method for automatic failover and redundant switching is provided. The method includes an automatic autonomous redundant switch detecting a malfunction of a first ATS. Further, the method includes, in response to detecting the malfunction of the first ATS, the automatic switch automatically releasing racking interlocks of the first ATS. Still further, the method includes a motorized rack-out mechanism of the automatic switch automatically isolating the first ATS. Yet still further, the method includes, the automatic switch resuming operation by operating a second ATS in place of the first ATS.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

The novel features believed characteristic of the illustrative embodiments are set forth in the appended claims. The illustrative embodiments, however, as well as an example mode of use, further objectives and descriptions thereof, will best be understood by reference to the following detailed description of illustrative embodiments of the present disclosure when read in conjunction with the accompanying drawings, wherein:

DETAILED DESCRIPTION

Figure 1:
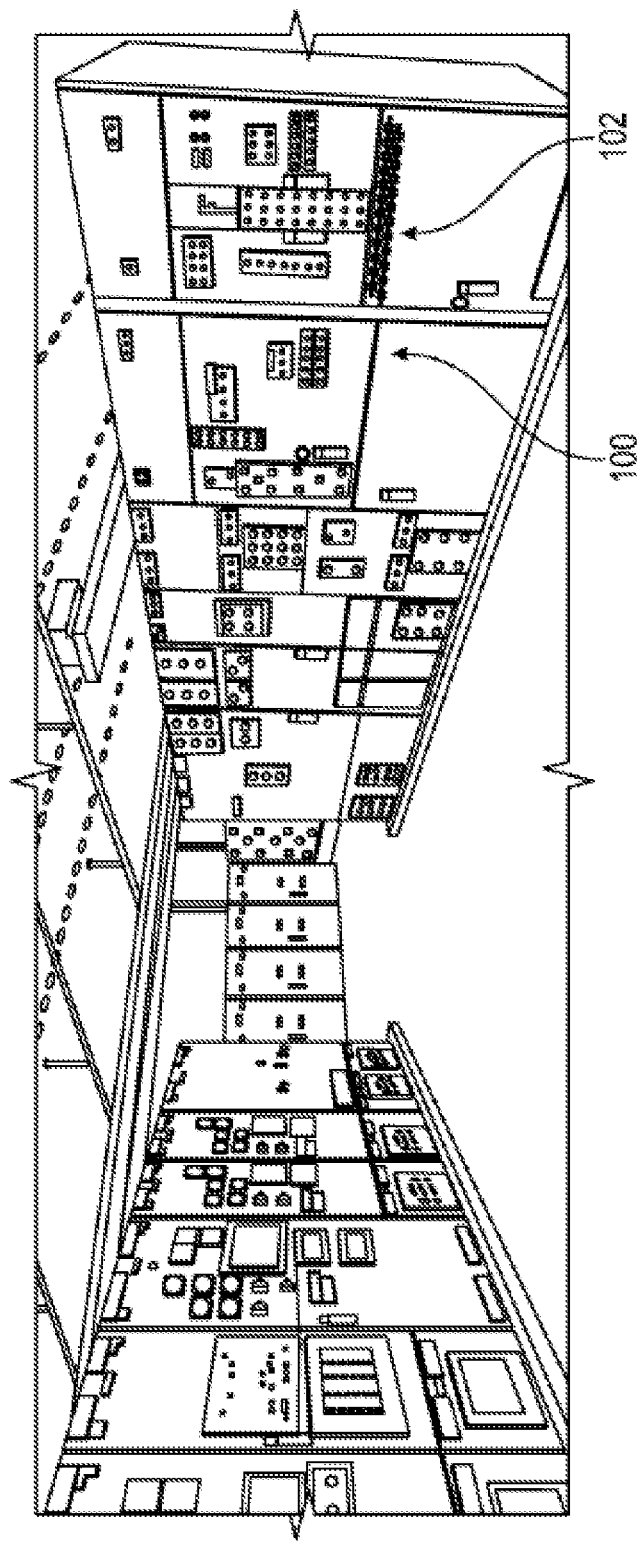
FIG. 1 depicts an example of existing bypass-isolation switches in an example electrical room.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

The present disclosure is generally directed to a powered actuator-driven rack-out method for use with an electric power switching apparatus, such as a bypass-isolation transfer switch. More specifically, the present disclosure is generally directed to a powered actuator-driven rack-out mechanism and related controls for use with an electric power switching transfer switch.

A typical arrangement for an existing bypass-isolation transfer switch is described with reference to FIGS. 1-3. In particular, FIG. 1 illustrates example bypass isolation transfer switches 100 and 102. Typically, in a bypass-isolation transfer switch, one switch is removable and this removable switch is provided with isolation means that allow for (i) disconnecting the switch from a bus structure and (ii) removal out of the enclosure of the switch. The removable switch is typically provided with a manual handle attached to a rack-out mechanism (also commonly referred to as a draw-out/draw-in mechanism) that connects or disconnects the switch from a fixed bus structure.

Figure 2A:
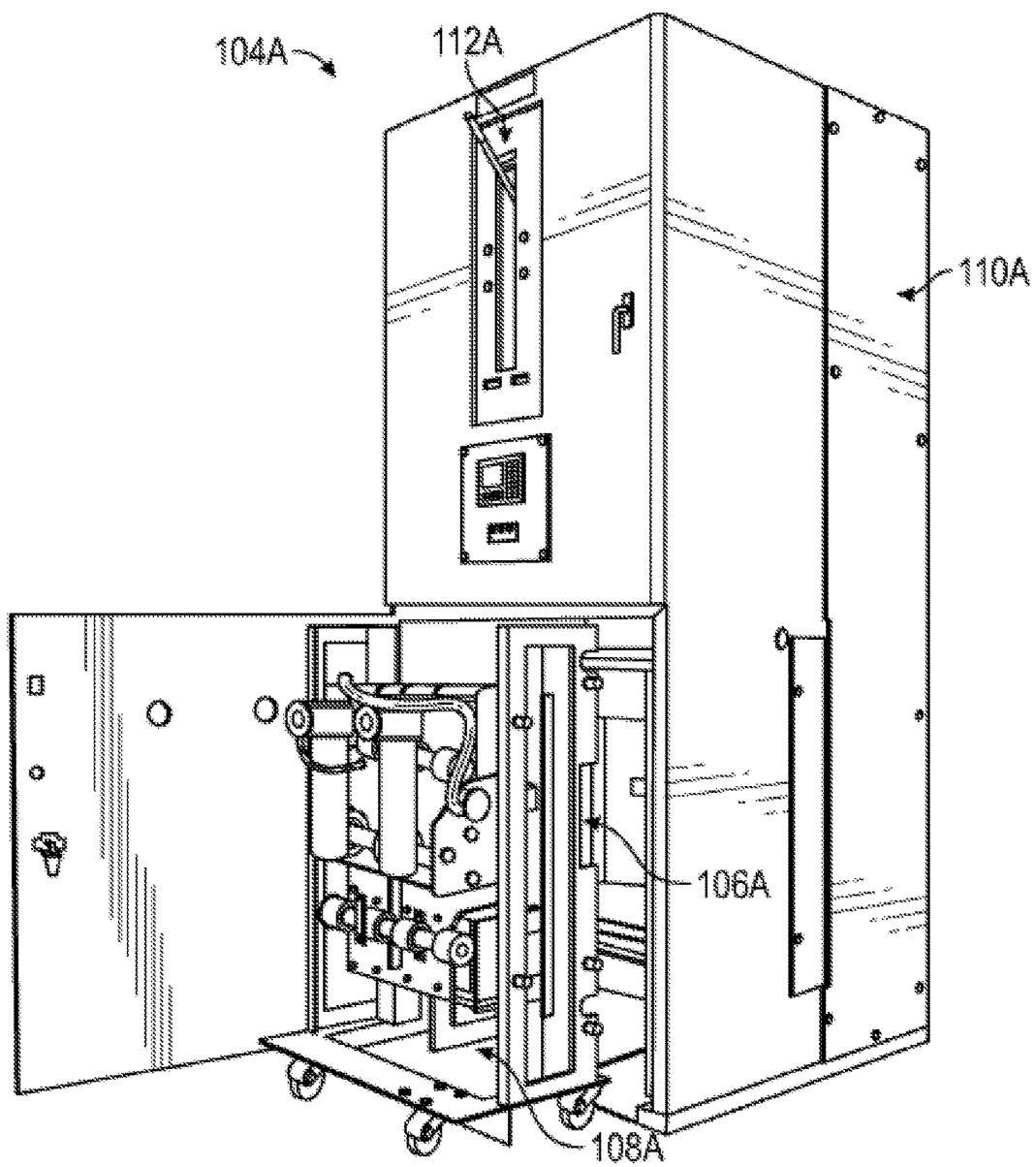
FIGS. 2A-B depict examples of existing bypass-isolation switches.
Figure 2B:
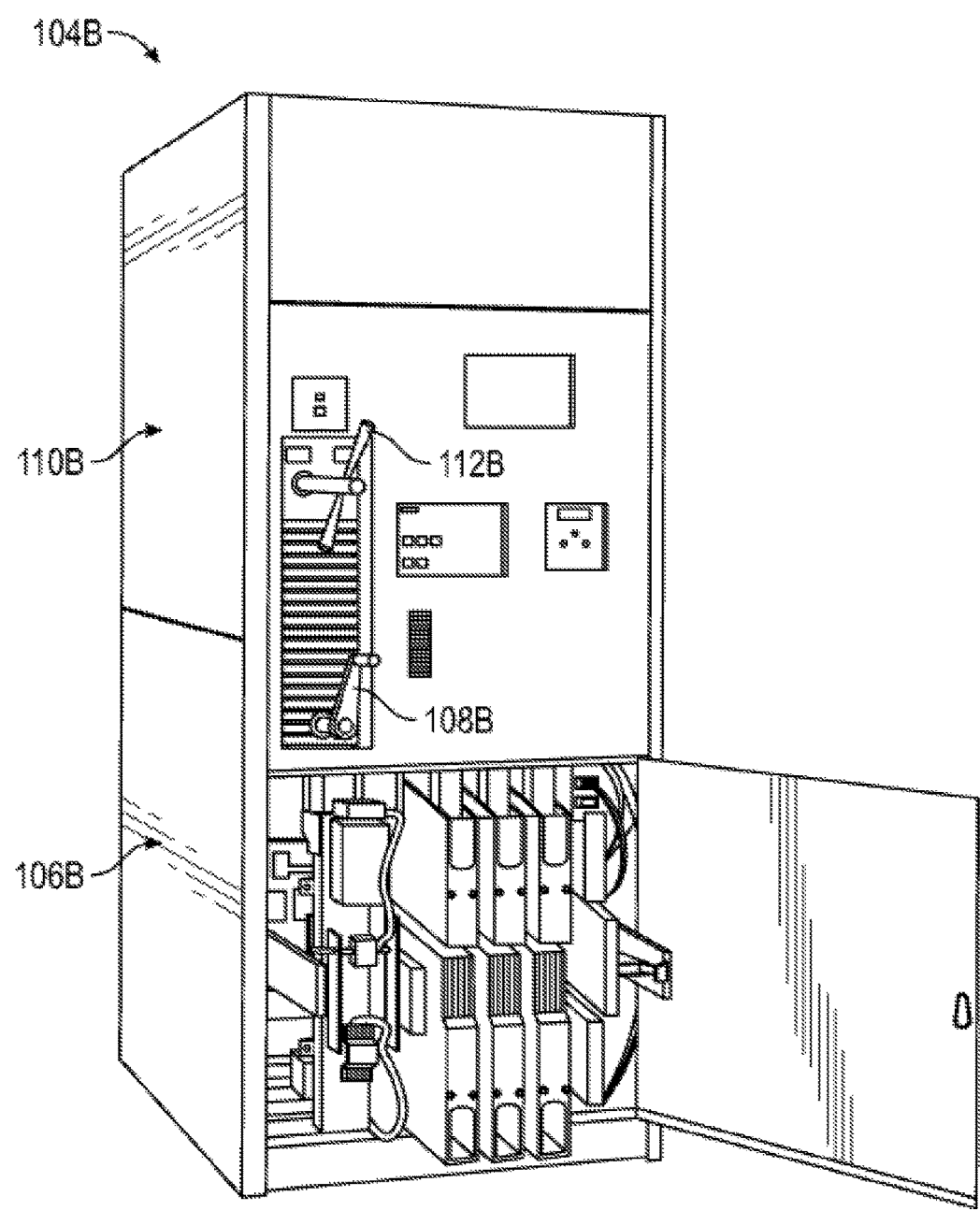

FIGS. 2A-B illustrate, respectively, example bypass-isolation transfer switches 104a and 104b. As shown in FIG. 2a, bypass isolation transfer switch 104a includes a removable lower ATS 106a with a manual draw-out handle 108a. Further, bypass isolation transfer switch 104a includes a fixed upper manual bypass switch 110a with a bypass manual actuation handle 112a. Similarly, as shown in FIG. 2b, bypass isolation transfer switch 104b includes a removable lower ATS 106b with a manual draw-out handle 108b and a fixed upper manual bypass switch 110b with a bypass manual actuation handle 112b.

Figure 3A:
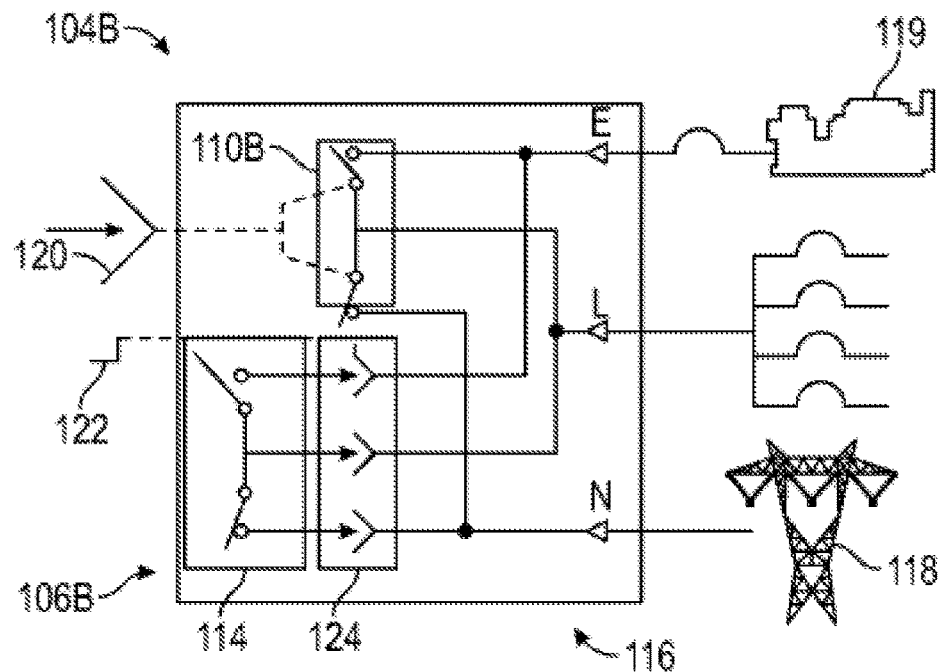
FIG. 3A depicts a diagram of a switch mechanism of an existing bypass-isolation switch in a "connected" position.
Figure 3B:
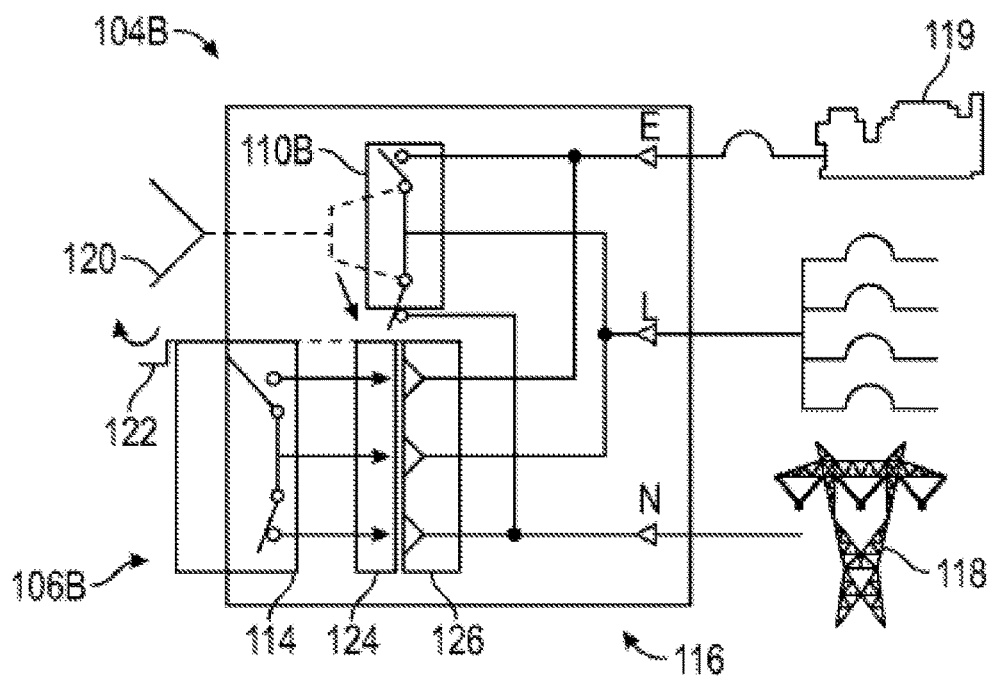
FIG. 3B depicts a diagram of a switch mechanism of an existing bypass-isolation switch in a "test" position.
Figure 3C:
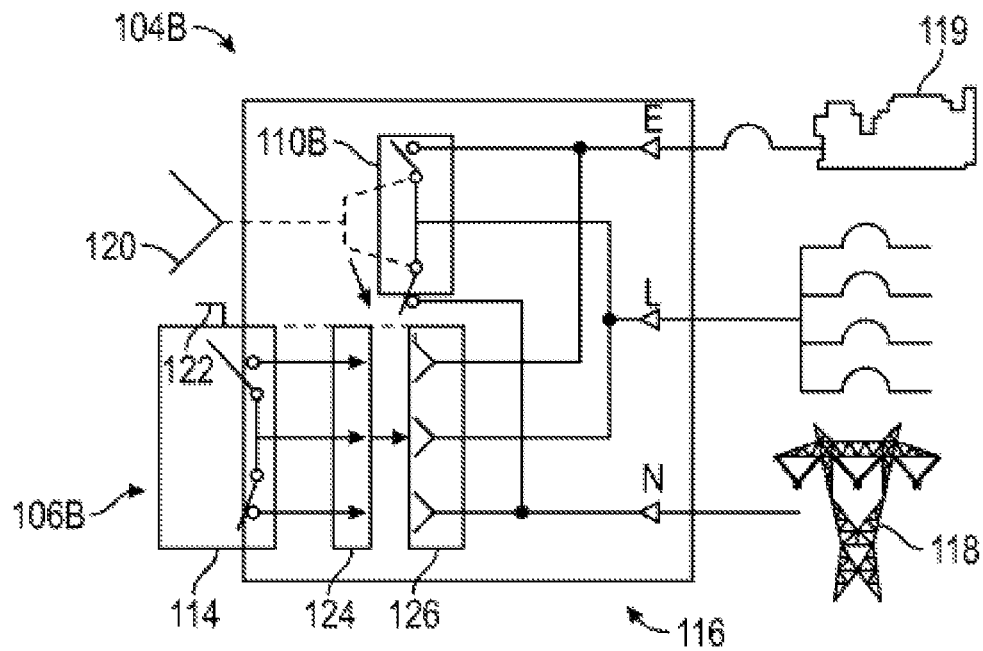
FIG. 3C depicts a diagram of a switch mechanism of an existing bypass-isolation switch in an "isolated" position.

FIGS. 3A, 3B, and 3C demonstrate a typical sequence of operation of a typical bypass-isolation transfer switch, such as bypass-isolation transfer switch 104b. In particular, FIG. 3A depicts a first step of the typical sequence of operation of bypass-isolation transfer switch 104b. The bypass-isolation transfer switch 104b is connected to normal power source 118 and emergency power source 119. In order to disconnect the transfer-switch mechanism 114 from the electrical bus 116, a user must first transfer the "upper" bypass switch 110b to the same source (e.g., normal power source 118) as the "bottom" automatic switch 106b. This requires the user to visually inspect the "bottom" switch 106b to determine the source (e.g., normal power source 118) to which the "bottom" switch 106b is connected. After the position of "bottom" switch 106b is determined, the user then transfers the "upper" switch 110b to the same source (e.g., normal power source 118) as the "bottom" switch 106b by turning the manual handle 120 attached to the "upper" bypass switch mechanism 110b. Since it is important that both "upper" switch 110b and "lower" switch 106b are connected to the same source (e.g., normal power source 118) to avoid electrical short, traditional bypass isolation switches are fitted with mechanical interlocks that prevent shorting of loads.

FIG. 3B depicts a second step of the typical sequence of operation. In particular, when both "bottom" switch 106b and "upper" switch 110b are connected to the same source (e.g., normal power source 118), the user will rotate the isolation crank handle 122 to move the switch 106b from the "connected" position to the "test" position. In the "test" position the isolation connectors 124 are disconnected from the bus attachment 126. In this position, the automatic transfer-switch mechanism 114 can be tested without interrupting either source.

FIG. 3C depicts a third step of the typical sequence of operation. In particular, the user may continue to turn the isolation handle 122 to move the switch from the "test" position to the "isolated" position. In this position, the switch 106b is disconnected from the electrical bus 116 and control circuits. Service personnel may then service and repair switch 106b as needed.

This typical bypass-isolation transfer switch arrangement shown in FIGS. 1-3 suffers from certain perceived limitations and disadvantages. For example, as mentioned above, in order to disconnect the transfer-switch mechanism from the electrical bus, a user must visually inspect the "bottom" switch to determine the source to which the switch is connected. Further, existing bypass-isolation transfer switches require a user to operate the bypass-isolation transfer switch locally. It is desirable to make the operation, testing, and maintenance of bypass-isolation transfer switches as easy and as intuitive as possible. Thus, a means is needed to simplify the operating process, reduce complexity, but still maximize safety to remove the potential for unintended consequences such as short-circuits. Further, a means is needed in some cases to operate the bypass-isolation transfer switch remotely. Example problems associated with existing bypass-isolation transfer switches such as bypass-isolation transfer switch 104b can be addressed by the systems and methods disclosed in the present application.

An example automatic autonomous redundant switch in accordance with the present disclosure is configured to provide energy from either a first power source or a second power source to a load is provided. The automatic autonomous redundant switch includes a first ATS and a second ATS. The automatic autonomous redundant switch further includes an interconnecting bus configured to connect the first ATS and the second ATS, and at least one controller configured to control the operation of the first ATS and the second ATS. Still further, the first ATS and the second ATS each include: (i) a respective transfer-switch mechanism; (ii) a respective bus attachment configured to connect to the interconnecting bus; and (iii) a respective motorized rack-out mechanism having a powered actuator. The respective motorized rack-out mechanism is configured to move the respective transfer-switch mechanism between (i) a connected position in which the respective bus attachment is connected to the respective transfer-switch mechanism and (ii) an isolated position in which the respective bus attachment is isolated from the respective transfer-switch mechanism.

Unlike typical transfer switches utilizing various manual control and rack-out methods, the proposed design utilizes a powered actuator. In an example embodiment, the powered actuator may be of various types including, for example: hydraulic, pneumatic, electric, stored energy, or any other type that utilizes a source of energy (other than human muscles) to provide movement. Further, the disclosed systems and methods allow the switch to be controlled locally and/or remotely.

Beneficially, the disclosed systems and powered actuator driven rack-out methods may be universally applicable to transfer switches of different types and sizes, and configurable for different redundant functions including, among others, a new type of automatic transfer bypass comprised of multiple automatic transfer switch modules with independent transfer and rack-out control functions interconnected with each other to provide multiple redundancies.

2. Example Systems and Methods

Figure 6A:
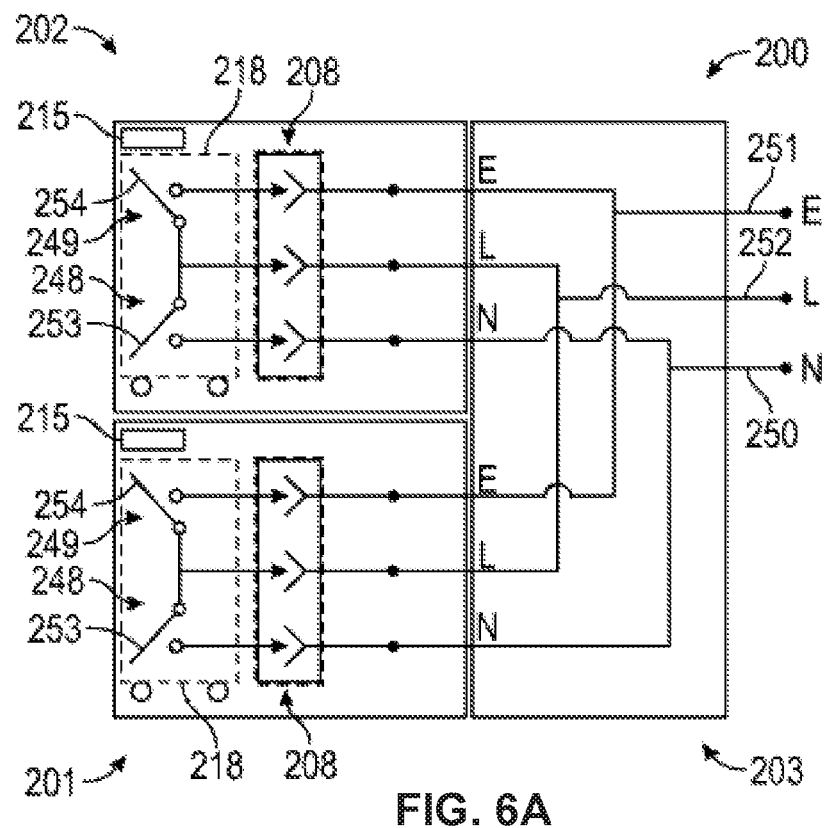
FIG. 6A depicts an interconnection schematic for the example switch shown in FIG. 5, where the two ATSs are shown in a "connected" position, according to an example embodiment of the present disclosure.
Figure 5:
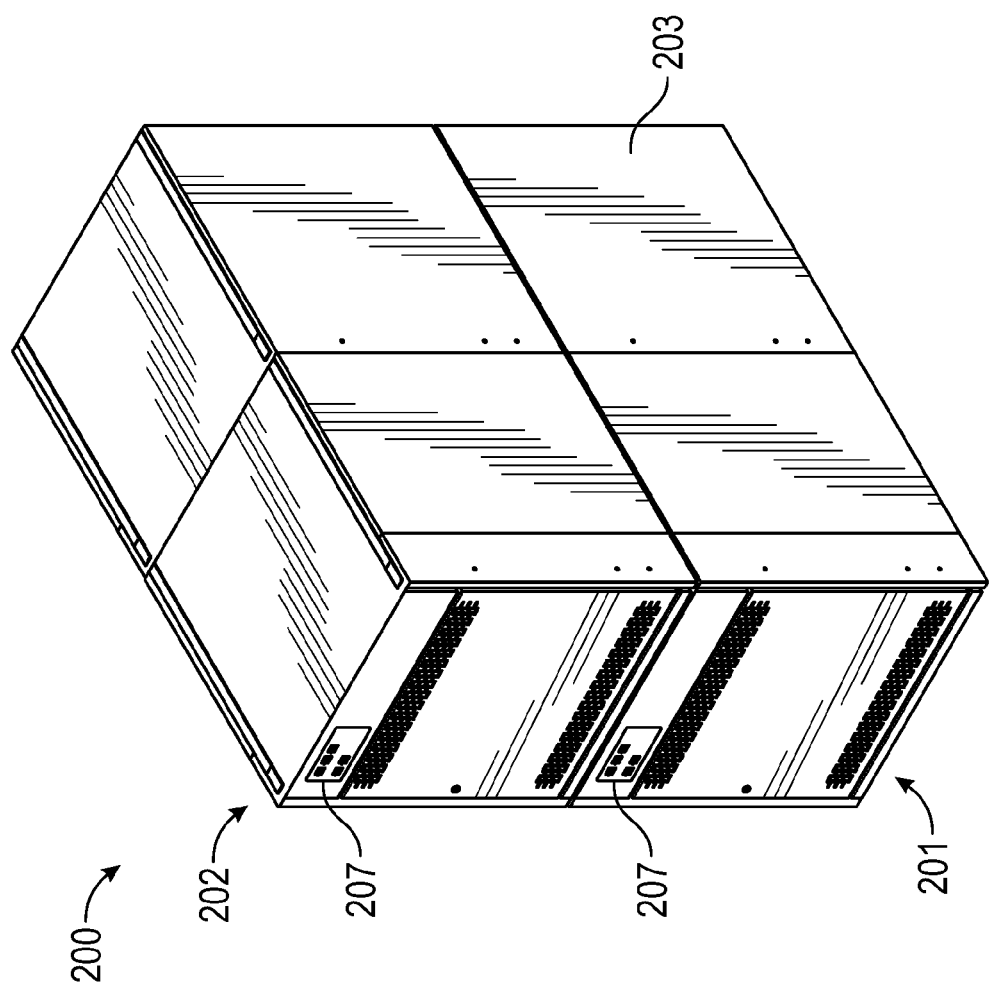
FIG. 5 depicts a perspective view of an example autonomous redundant switch with two ATS modules and an interconnecting bus module, according to an example embodiment of the present disclosure.
Figure 4:
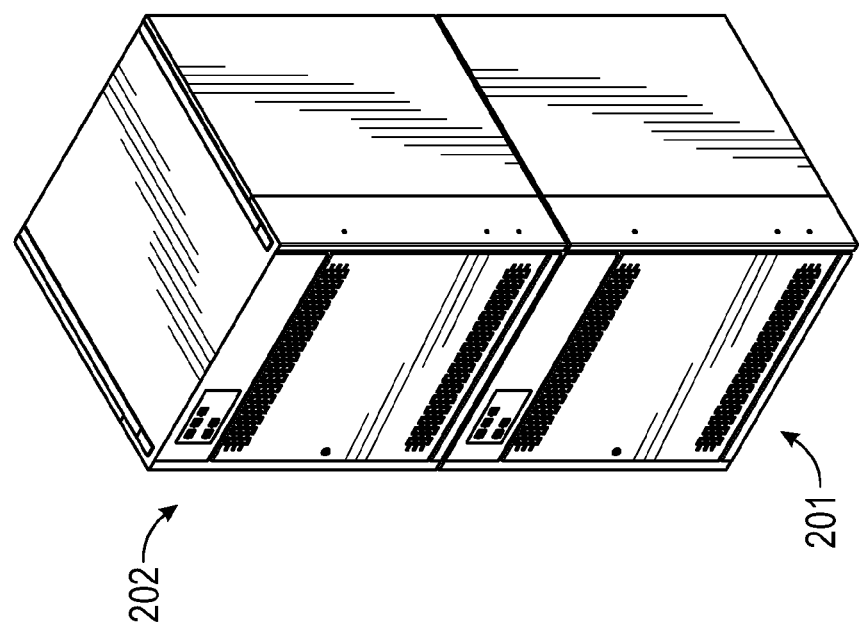
FIG. 4 depicts a perspective view of example automatic transfer switches (ATSs) with motorized rack-out mechanisms, according to an example embodiment of the present disclosure.
Figure 6B:
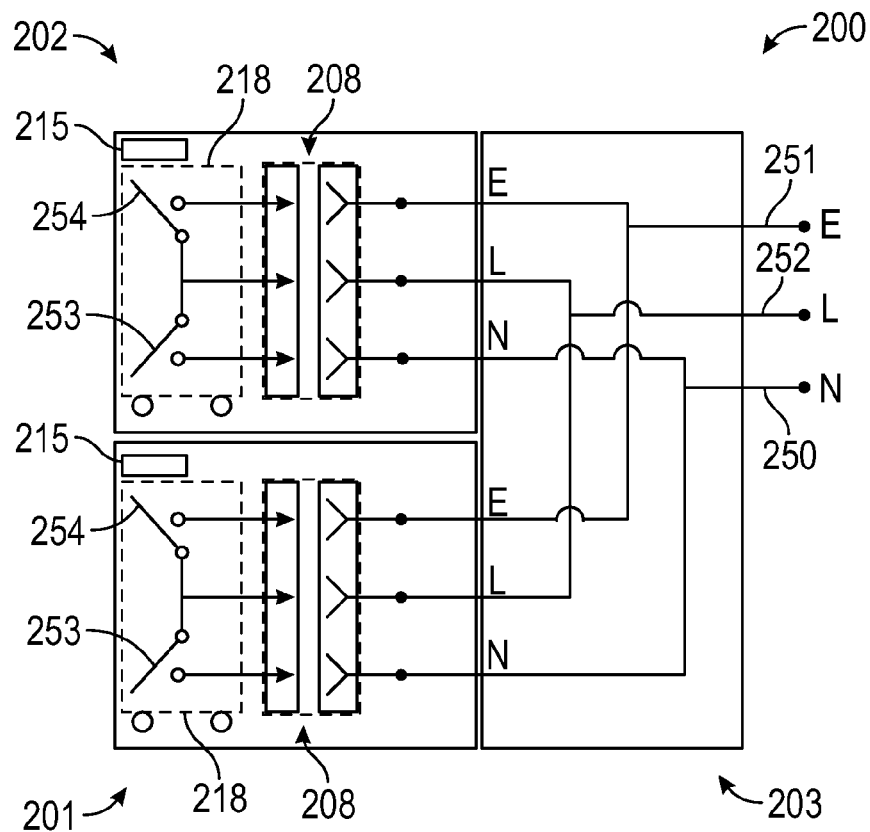
FIG. 6B depicts an interconnection schematic for the example switch shown in FIG. 5, where the two ATSs are shown in an "isolated" position, according to an example embodiment of the present disclosure.

FIG. 4 depicts an example first ATS 201 with a motorized rack-out mechanism and an example second ATS 202 with a motorized rack-out mechanism. Further, FIGS. 5 and 6A-B depict an example automatic autonomous redundant switch 200 that includes first ATS 201 and second ATS 202. The automatic switch 200 further includes an interconnecting bus 203 configured to connect the first ATS 201 and the second ATS 202 and at least one controller 207 (see FIG. 5) configured to control the operation of the first ATS 201 and the second ATS 202.

With reference to FIGS. 6A-6B, the automatic switch 200 is configured to provide energy from a first power source 250 or a second power source 251 to a load 252. Further, the first ATS 201 and the second ATS 202 each include: (i) a respective transfer-switch mechanism 218; (ii) a respective bus attachment 208 configured to connect to the interconnecting bus 203; and (iii) a respective motorized rack-out mechanism 215 having a powered actuator. The respective motorized rack-out mechanism 215 is configured to move the respective transfer-switch mechanism 218 between (i) a connected position (see FIG. 6A) in which the respective bus attachment 208 is connected to the respective transfer-switch mechanism 218 and (ii) an isolated position (see FIG. 6B) in which the respective bus attachment 208 is isolated from the respective transfer-switch mechanism 218.

The respective transfer-switch mechanism 218 includes a respective first main switch 248 configured to connect the first power source 250 to the load 252 upon closing of the respective first main switch contacts 253 and (ii) a respective second main switch 249 configured to connect the second power source 251 to the load 252 upon closing of the respective second main switch contacts 254. Further, the respective transfer-switch mechanism 218 is configured to operate (i) in a first mode in which the respective first main switch contacts 253 are closed, (ii) in a second mode in which the respective second main switch contacts 254 are closed, and (iii) in a third mode in which both the respective first main switch contacts 253 and the respective second main switch contacts 254 are open.

In the example of FIG. 5, ATS module 201, ATS module 202, and interconnecting bus structure 203 each have a different housing or enclosure. However, one or more of these components may share the same housing or enclosure. For instance, in an example embodiment, all three components can be mounted in a single housing or enclosure.

The automatic autonomous redundant switch 200 and the operation of automatic autonomous redundant switch 200 are described in further detail with respect to FIGS. 7-15. These Figures depict ATS 201 and various components of ATS 201 in further detail. ATS 202 is the same as or is similar in many respects to ATS 201 and, thus, is not described in as great of detail. It should be explicitly noted, however, that any possibilities and permutations described herein with respect to ATS 201 may equally apply to ATS 202.

Figure 7:
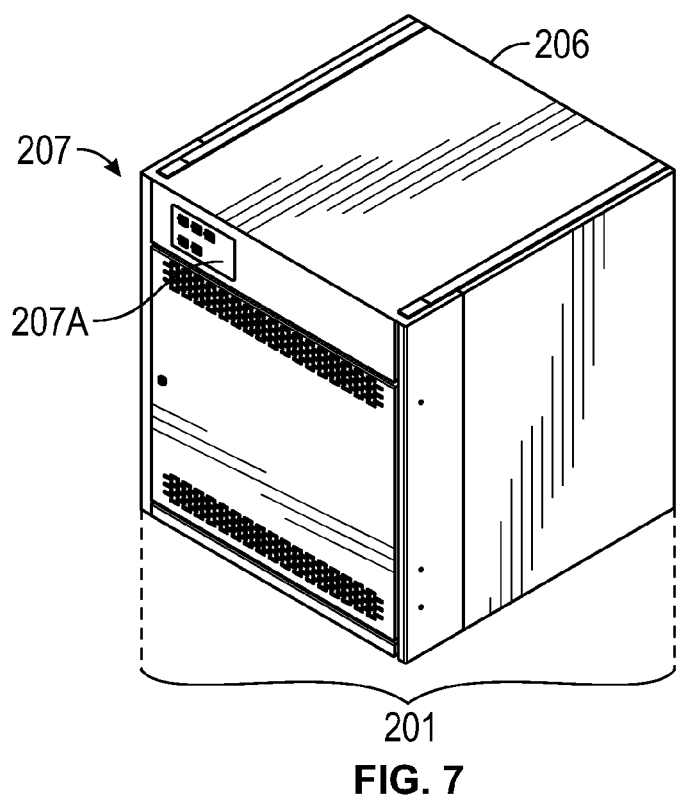
FIG. 7 depicts a perspective view of an example single ATS module, according to an example embodiment of the present disclosure.

FIG. 7 depicts a perspective view of ATS 201. ATS 201 includes an enclosure 206 and a controller 207 having a control panel 207*a*. Controller 207 is configured to control the operation of ATS 201. For instance, controller 207 is configured to control an operation mode of ATS 201. Example operation modes include a mode in which the ATS 201 is connected to a normal source of energy (e.g., first power source 250 shown in FIG. 6*a*), a mode in which the ATS 201 is connected to an emergency source of energy (e.g., second power source 251 shown in FIG. 6*a*), and a mode in which the ATS 201 is in an open position. Further, controller 207 is configured to control a position of the motorized rack-out mechanism 215 and thus the rack position of transfer-switch mechanism 218. Example positions include a connected position, an isolated position, and a test position. Controller 207 and example functions that can be carried out by controller 207 are described in greater detail below with reference to FIGS. 16 and 18-20.

In the example of FIG. 7, control panel 207*a* is mounted to the enclosure 206. In another example, control panel 207*a* or another control panel is located in a remote location away from the ATS 201 and controller 207. This may, for example, allow a user to control the operation of ATS remotely.

As mentioned above, automatic switch 200 includes at least one controller 207 configured to control the operation of the first ATS 201 and the second ATS 202. In the example of FIG. 5, ATS 201 includes a first controller and ATS 202 includes a second controller different from the first controller. However, in another embodiment, a single controller is used to control both ATS 201 and ATS 202. In an example, each ATS 201, 202 includes a separate controller, and the separate controller in each module will perform as backup redundant controller that can take over control if one of the controllers fails to function. Other example controller configurations are possible as well.

Figure 8:
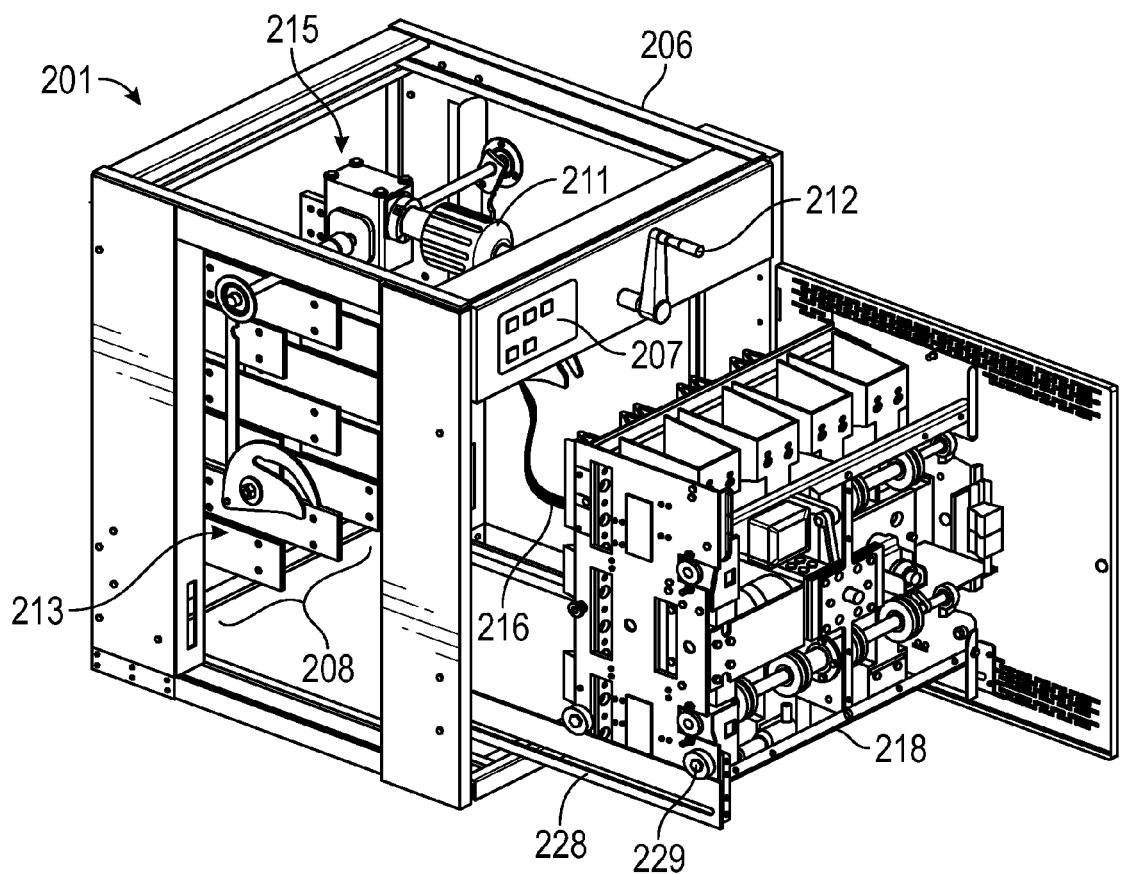
FIG. 8 depicts a perspective view of the example single ATS module of FIG. 7 with the transfer-switch mechanism racked-out and pulled out of the enclosure, according to an example embodiment of the present disclosure.

FIG. 8 illustrates ATS 201 with the transfer-switch mechanism 218 racked-out and pulled out of the enclosure. As shown in FIG. 8, ATS 201 includes transfer-switch mechanism 218, motorized rack-out mechanism 215 having powered actuator 211, manual handle 212, controller 207, bus attachment 208 that includes a plurality of bus stabs 213, controller 207, and enclosure 206. In this Figure, the ATS 201 is in an isolated position in which the bus attachment 208 is isolated from the respective transfer-switch mechanism 218. The transfer mechanism 218 is provided with wheels 229 that roll on pull-out rails 228 attached to enclosure 206. The transfer-switch mechanism 218 is moved in and out by the motorized rack-out mechanism 215. Controller 207 controls the operation of both transfer-switch mechanism 218 and motorized rack-out mechanism 215. Further, a user may operate controller 207 by providing user inputs via the control panel 207*a*.

Figure 9:
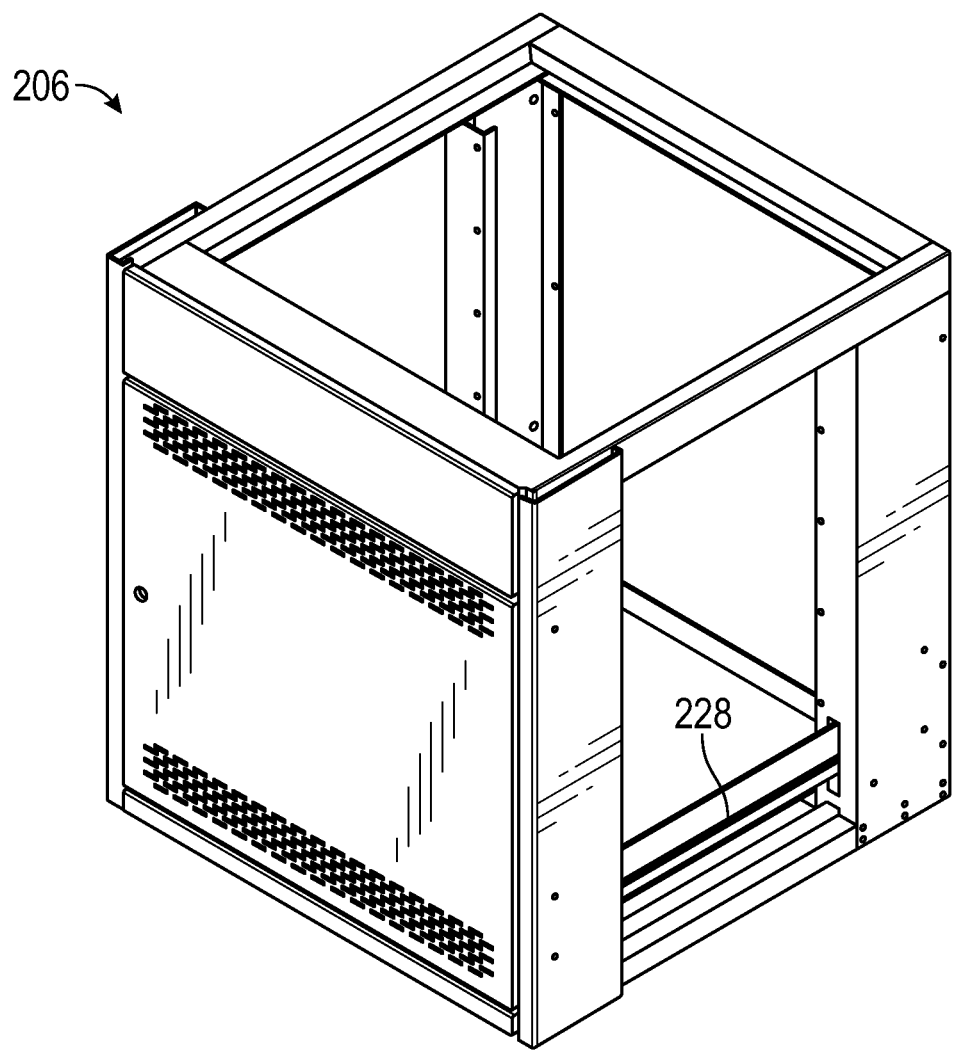
FIG. 9 depicts a perspective view of the enclosure of the single ATS module of FIG. 7, according to an example embodiment of the present disclosure.

FIG. 9 depicts the enclosure 206 of ATS 201. Enclosure 206 serves to house the internal components of ATS 201. Further, pull out rails 228 are connected to the enclosure 206 and are configured to slide in and out of the enclosure 206, so as to allow the transfer-switch mechanism 218 to be racked in and out (also commonly referred to as drawn-in and drawn out).

Figure 10:
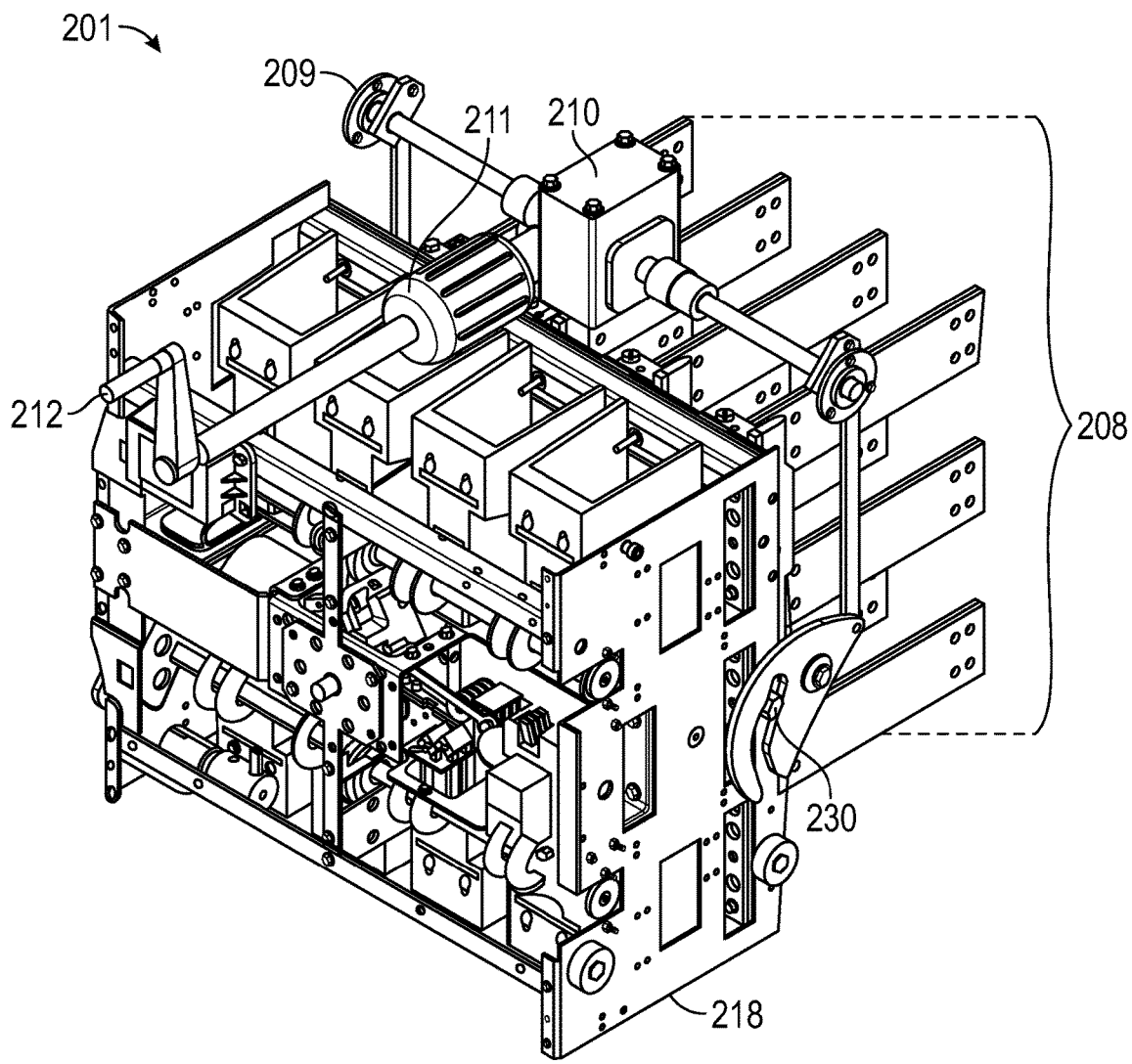
FIG. 10 depicts a perspective view of the single ATS module of FIG. 7 without the enclosure, according to an example embodiment of the present disclosure.

FIG. 10 depicts a perspective view of the ATS 201 without the enclosure 206. In FIG. 10, the ATS 201 is in a connected position in which the bus attachment 208 is connected to the transfer-switch mechanism 218. Bus attachment 208 may connect to the interconnecting bus 203 (see FIGS. 6A-B). When the bus attachment 208 is connected to the transfer-switch mechanism 218, isolation connectors of the transfer-switch mechanism 218 are in communication with the bus attachment 208.

Figure 11:
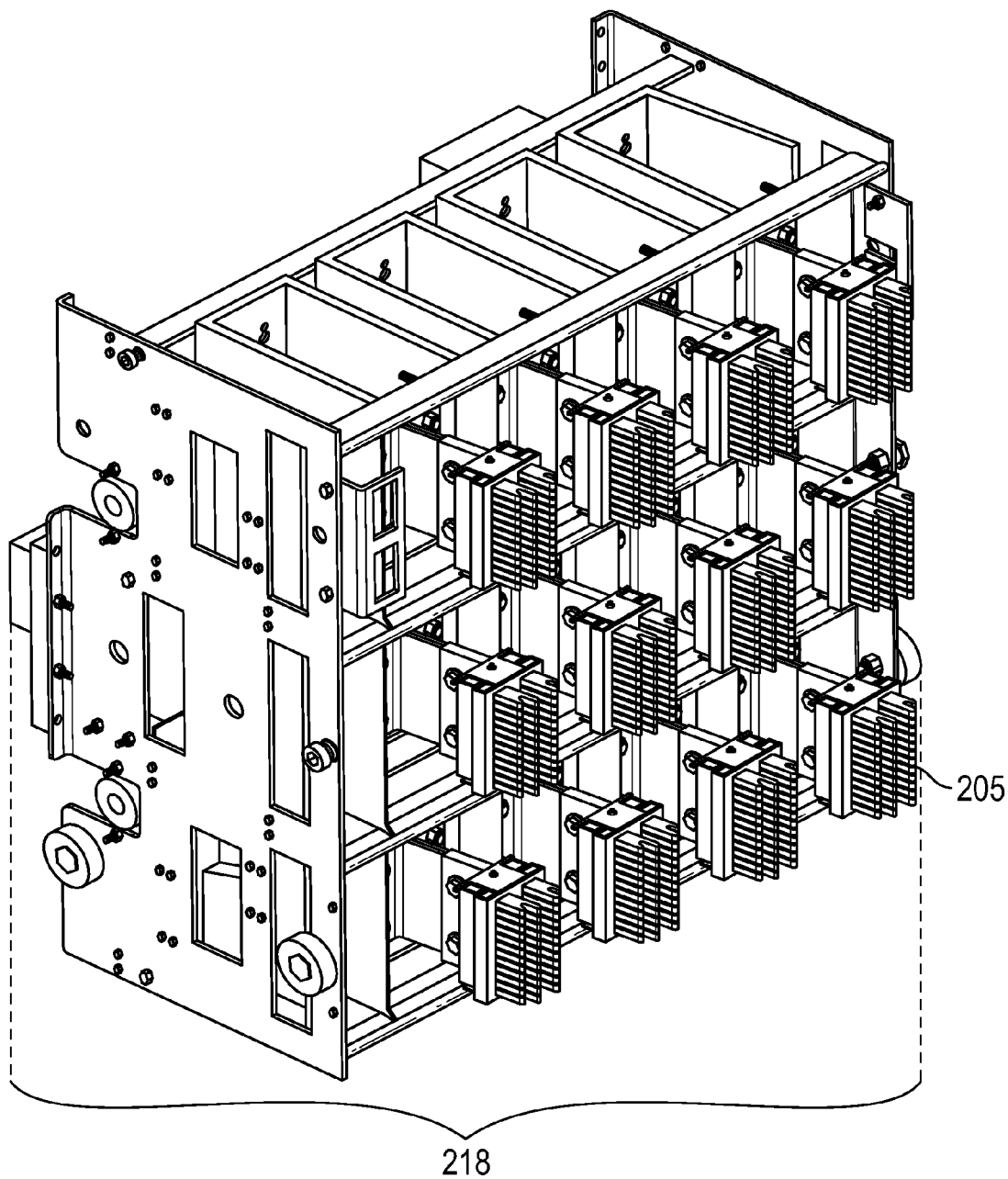
FIG. 11 depicts a perspective view of isolation connectors of the single ATS module of FIG. 7, according to an example embodiment of the present disclosure.
Figure 12B:
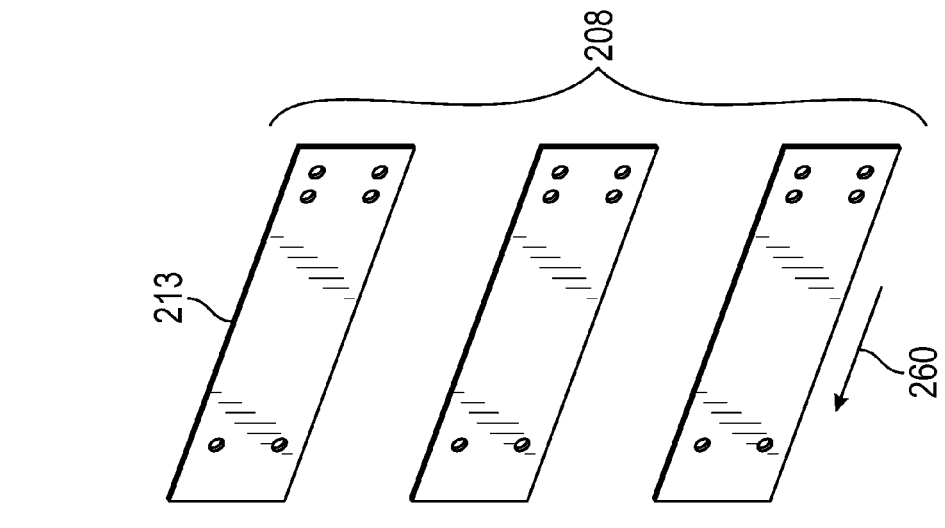
FIG. 12B depicts a perspective view of the isolation connectors and the bus stabs of FIG. 12A in an "isolated/disconnected" position, according to an example embodiment of the present disclosure.
Figure 12A:
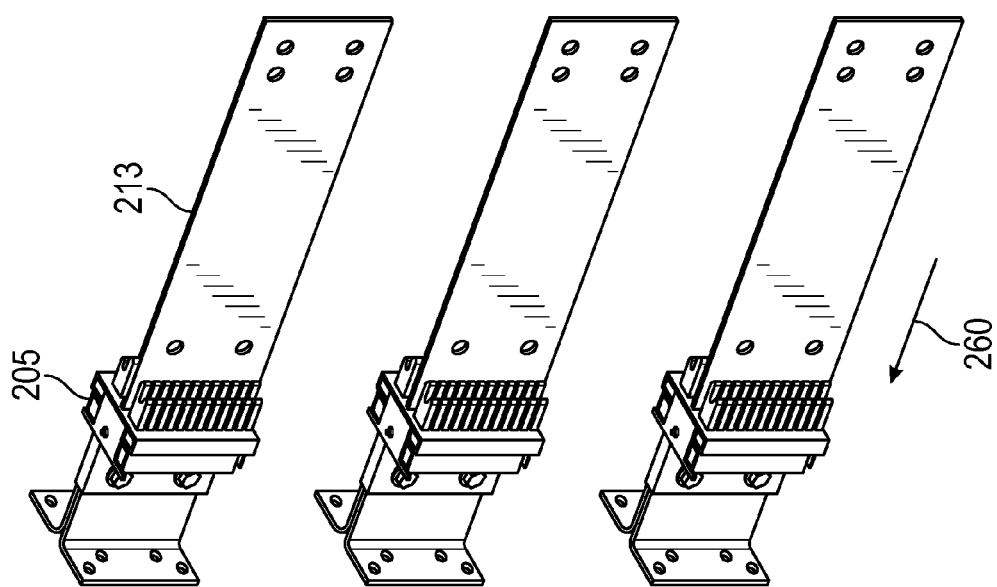
FIG. 12A depicts a perspective view of three isolation connectors and three bus stabs of the single ATS module of FIG. 7 in a "connected" position, according to an example embodiment of the present disclosure.

The isolation connectors are depicted in greater detail in FIG. 11. The transfer-switch mechanism 218 includes one or more isolation connectors 205, which are configured to connect with bus stabs 213 of bus stab attachment (see FIGS. 12A-B). FIG. 12A illustrates example isolation connectors 205 of the transfer mechanism 218 and example bus stabs 213 of the bus attachment 208 in a "connected" position. Further, FIG. 12B illustrates example isolation connectors 205 of the transfer mechanism 218 and example bus stabs 213 of the bus attachment 208 in an "isolated/disconnected" position.

As mentioned above, the motorized rack-out mechanism 215 is configured to move the transfer-switch mechanism 218 between (i) the connected position in which the bus attachment 208 is connected to the transfer-switch mechanism 218 and (ii) the isolated position in which the bus attachment 208 is isolated from the transfer-switch mechanism 218. The motorized rack-out mechanism 215 includes mechanical linkage coupling the powered actuator 211 and the transfer-switch mechanism 218. When the powered actuator is actuated, the mechanical linkage may force the transfer-switch mechanism 218 to rack in or rack out.

Figure 13A:
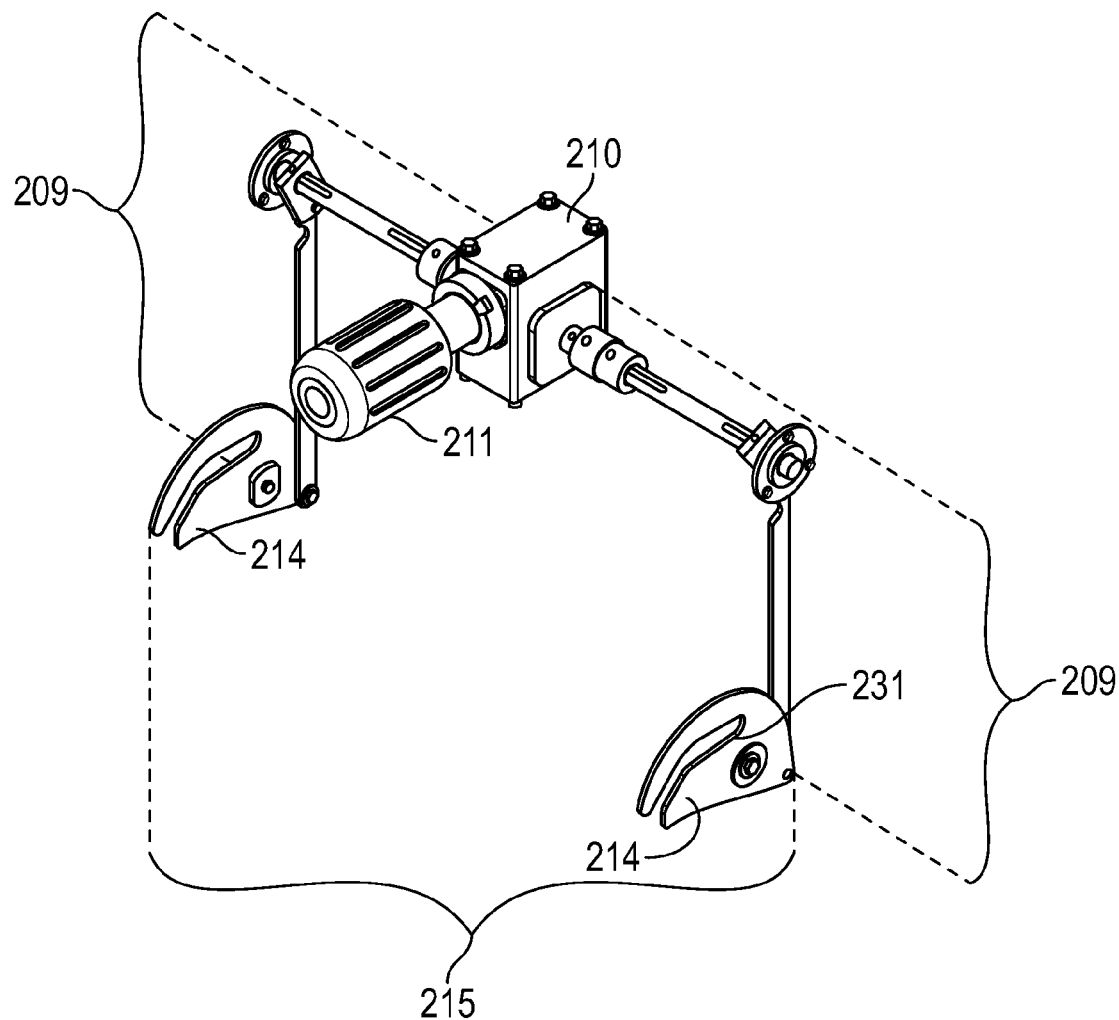
FIG. 13A depicts a perspective view of an example rack-out mechanism actuator and linkage assembly of the single ATS module of FIG. 7, according to an example embodiment of the present disclosure.

An example motorized rack-out mechanism 215 is described in further detail with reference to FIGS. 13A-C. As shown in FIG. 13A, motorized rack-out mechanism 215 includes a gearbox 210 coupled to powered actuator 211. The powered actuator 211 may be any suitable powered actuator that serves to power the rack-out mechanism 215. For instance, the powered actuator 211 may be a hydraulic actuator, a pneumatic actuator, an electric actuator, and/or a stored-energy actuator. Other powered actuators are possible as well. Gearbox 210 is coupled to one or more draw-in mechanism linkage 209, which are in turn connected to one or more draw-in plates 214. Draw-in plates 214 are configured to engage with draw-out cam followers 230 (see FIGS. 10 and 13B-C) of transfer-switch mechanism 218, and actuation of the motorized rack-out mechanism 215 may move the transfer-switch mechanism 218 from the connected position to the isolated position. The draw-in plates 214 include a cam profile 231 that is configured to force the transfer-switch mechanism 218 to move a desired amount as draw-out cam followers 230 follow the cam profile 231. Other example mechanical linkage between the powered actuator and the transfer-switch mechanism are possible as well.

Figure 13B:
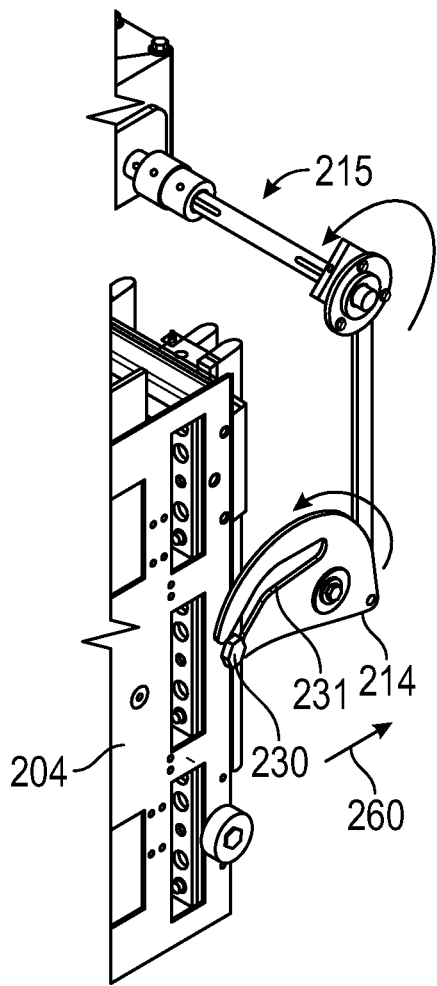
FIG. 13B depicts a perspective view of an example orientation of the rack-out mechanism linkage of FIG. 13A in an "isolated/disconnected" position, according to an example embodiment of the present disclosure.
Figure 13C:
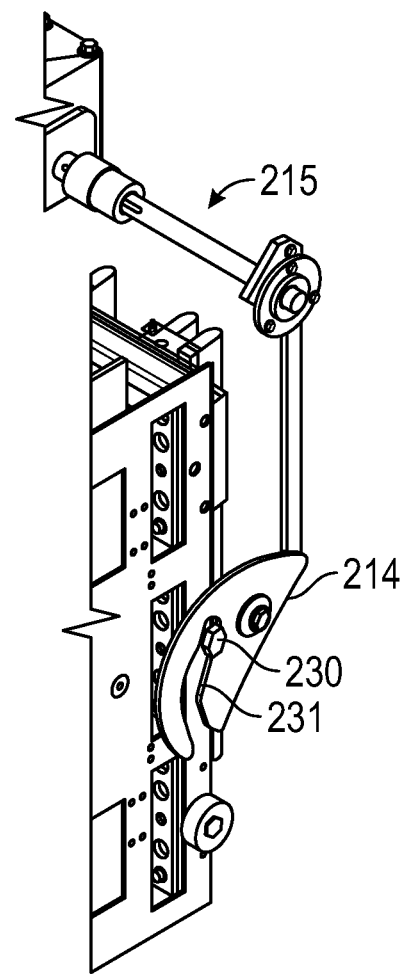
FIG. 13C depicts a perspective view of an example orientation of the rack-out mechanism linkage of FIG. 13A in a "connected" position, according to an example embodiment of the present disclosure.

FIG. 13B depicts an example orientation of the motorized rack-out mechanism 215 when the ATS 201 is in the "isolated/disconnected" position, and FIG. 13C depicts an example orientation of the motorized rack-out mechanism 215 when the ATS 201 is in the "connected" position. As can be seen from FIGS. 13B-13C, moving between the isolated position and the connected position causes the transfer mechanism 218 to translate a given amount in a proximal direction indicated by arrow 260. With reference to FIGS. 12A and 12B, moving from the isolated position (see FIG. 12B) to the connected position (see FIG. 12A) will cause the bus stabs 213 to engage with isolation connectors 205.

Figure 14B:
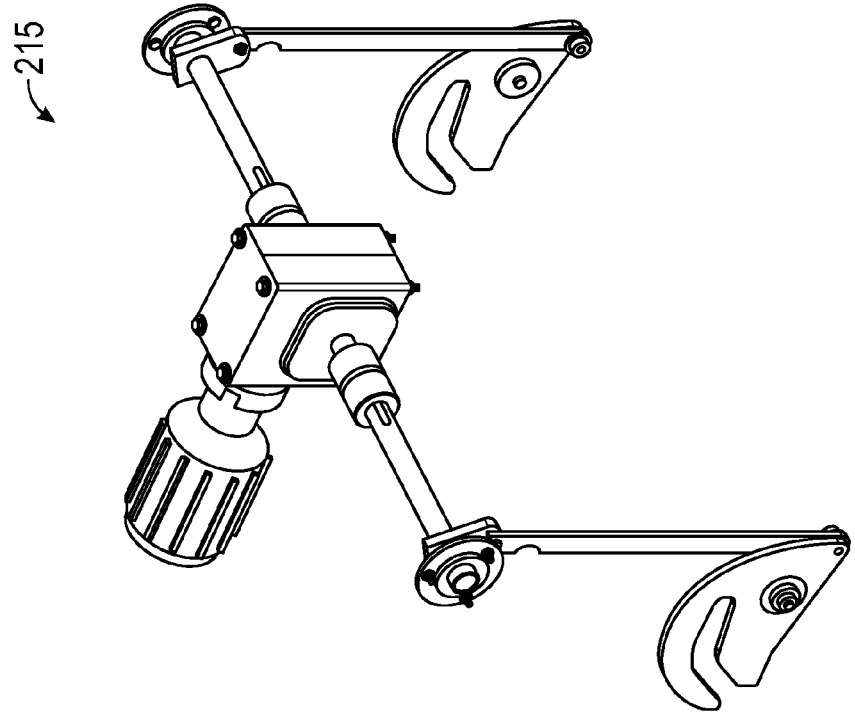
FIG. 14B depicts a perspective view of an example rack-out mechanism actuator and linkage assembly of the single ATS module of FIG. 7 without the optional manual operation handle, according to an example embodiment of the present disclosure.
Figure 14A:
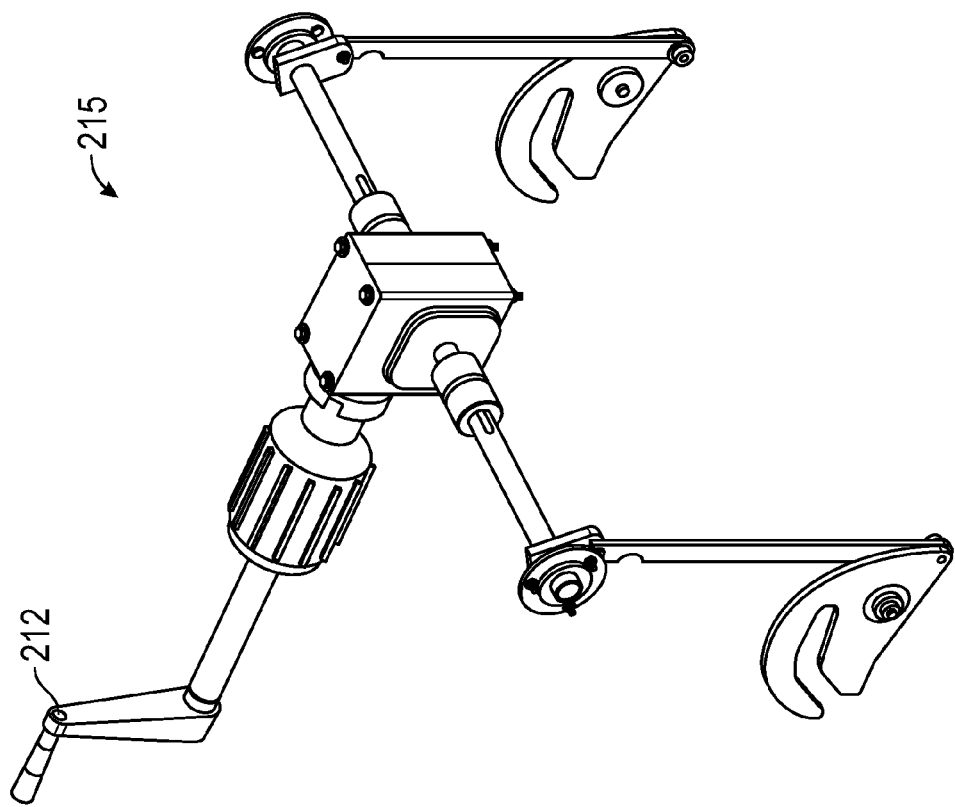
FIG. 14A depicts a perspective view of an example rack-out mechanism actuator and linkage assembly of the single ATS module of FIG. 7 with an optional manual operation handle, according to an example embodiment of the present disclosure.

In an example embodiment, powered actuator 211 can also be used together with a manual actuator (e.g., such as a manual handle). FIG. 14A depicts an example embodiment where the motorized rack-out mechanism 215 includes an optional manual operation handle 212, whereas FIG. 14B depicts an example embodiment where the motorized rack-out mechanism 215 does not include a manual operation handle. Rotation of the manual handle 212 may serve to provide a corresponding movement of the draw-in plates 214, so as to move the transfer-switch mechanism 218 to the connected or isolated position.

Figure 15B:
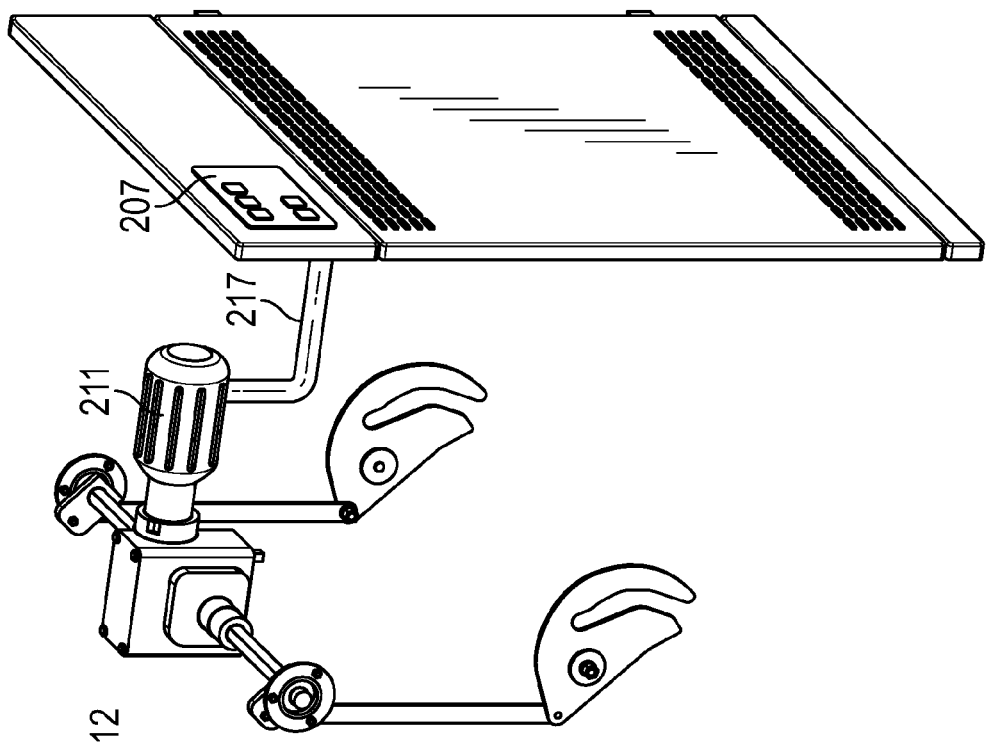
FIG. 15B depicts a perspective view of the example rack-out mechanism actuator of FIG. 14B connected to a control panel, according to an example embodiment of the present disclosure.
Figure 15A:
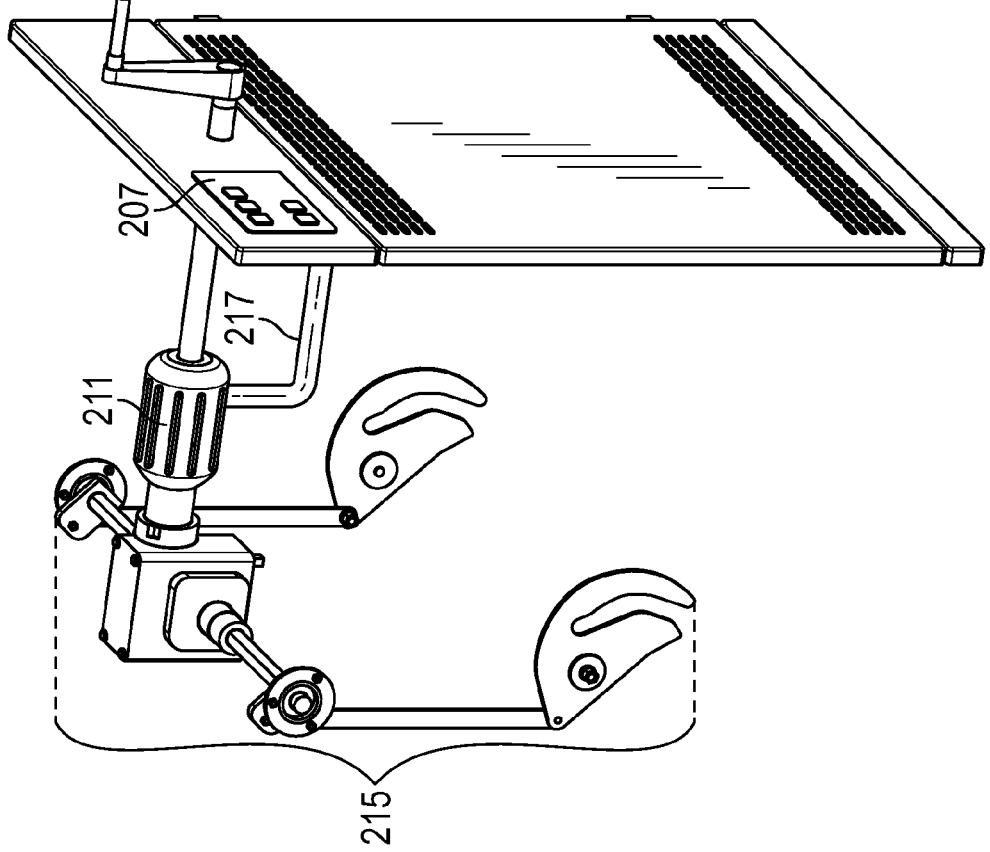
FIG. 15A depicts a perspective view of the example rack-out mechanism actuator of FIG. 14A connected to a control panel, according to an example embodiment of the present disclosure.

As mentioned above, controller 207 controls the operation of the motorized rack-out mechanism 215. FIG. 15A depicts the motorized rack-out mechanism 215 of FIG. 14A connected to the controller 207, and FIG. 15B depicts the motorized rack-out mechanism 215 of FIG. 14B connected to the controller 207. In particular, these Figures illustrate powered actuator 211 in communication with controller 207 via wire 217. Although a wired communication is illustrated in these figures, other communication types such as wireless communication are possible as well.

Unlike conventional bypass-isolation switches (e.g., bypass-isolation switches 104a, 104b shown in FIGS. 2A and 2B), the motorized rack-out autonomous redundant switch 200 provides additional utility and novel testing features. Notably, both first and second ATS modules 201 and 202 provide ability to automatically transfer electrical loads and isolate and reconnect each switch module 201, 202 from the electrical bus. For instance, each module 201, 202 may automatically switch source from "normal" to "emergency" and "emergency" to "normal." In addition, each module 201, 202 may be provided with "center-off" position which disconnects the load from both sources. Further, each module may be controlled to move to the "isolated" position from the "connected" position so as to disconnect the transfer-switch mechanism 218 from the interconnecting bus 203. In addition, each module can be provided with a "test" position in which the isolation connectors 205 are disconnected from bus stabs 213 while the transfer-switch mechanism control wiring 216 and the rack-out mechanism wiring 217 (see FIGS. 8, 15A-B, and 16) are still connected to provide test functions.

As just one example of such autonomous switch test functions, the autonomous switch 200 can perform certain diagnostics on itself. For example, the switch 200 may perform diagnostics on the transfer sources one or more times so as to verify that the mechanisms function properly. In addition, the switch 200 may also measure transfer times and may be able to monitor duty cycles so as to determine if the primary connectors require maintenance. In addition, the autonomous switch 200 can be programmed to schedule certain testing routines and perform such testing routines without user input or user initiation. Such testing routines could be automatically scheduled when a risk of interrupting building operations is less. For example, such testing routines may be performed during evenings when demand being placed on the switch 200 is power is reduced. Testing may be performed, for example, with isolating the first ATS module 201 in a test position, perform the diagnostics on the first ATS module 201, reconnect the first module and move on to repeat the diagnostics on the second ATS module 202, and then perhaps a third module. As such, if the testing diagnostics determines that a particular TAS module does not pass a particular testing protocol, the malfunctioning module will be moved to an isolate position, and an alarm may be programmed so as to indicate such a malfunction.

As mentioned above, controller 207 is configured to provide various functions for ATS 201. In an example embodiment, the control panel 207a includes at least one respective user input for automatically controlling an operation mode of the respective transfer-switch mechanism 218. The control panel 207a further includes at least one respective user input for automatically controlling a position of the respective rack-out mechanism 215. In an example embodiment, controller 207 is configured to provide at least six functions for ATS 201, and these six functions are described with reference to FIG. 16. Further, controller 207 may provide the same or similar functions for ATS 202. Alternatively, another controller may provide the same or similar functions for ATS 202.

Figure 16:
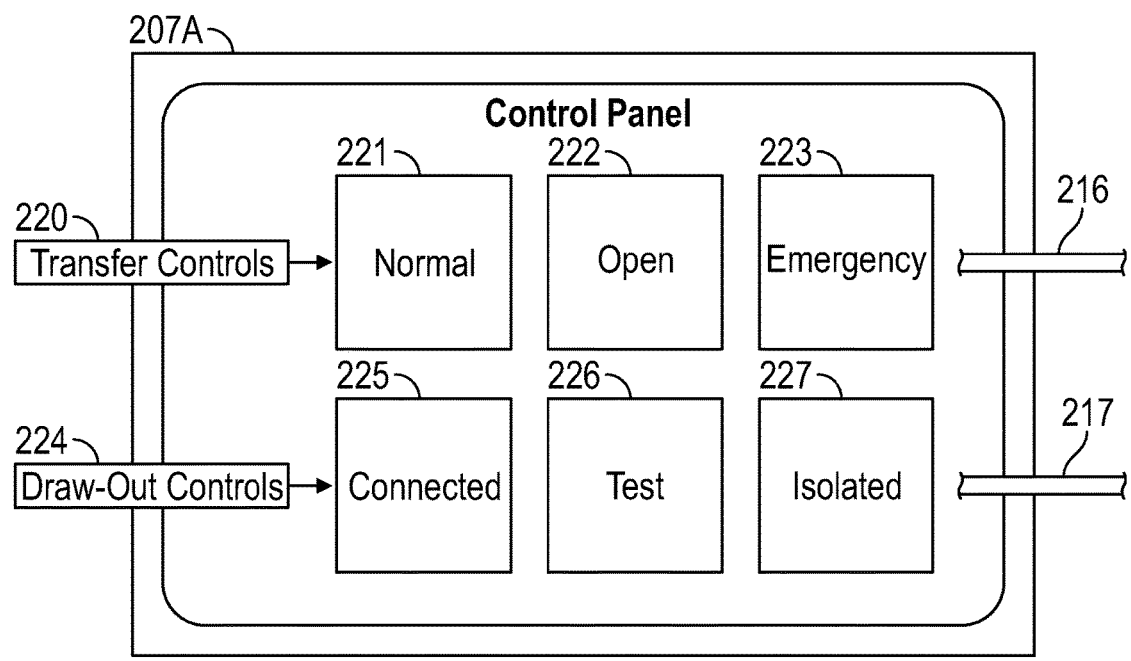
FIG. 16 depicts an example control panel layout, according to an example embodiment of the present disclosure.

With reference to FIG. 16, control panel 207a includes a set of controls 220 that control source transfer and a set of controls 224 that control the rack-out mechanism. Controls 220 may also be referred to as "transfer controls" and controls 224 may also be referred to as "draw-out/draw-in" controls. The transfer controls 220 are in communication with the transfer-switch mechanism 218 (e.g., via wire 216), and the draw-out/draw-in controls are in communication with the rack-out mechanism (e.g., via wire 217).

Transfer controls 220 include input 221 for closing normal source contacts, input 223 for losing emergency source contacts, and input 222 for opening both sources. Further, draw-out/draw-in controls 224 include input 225 for moving the transfer-switch mechanism 218 to the "connected" position, input 226 for moving the transfer-switch mechanism 218 to the "test" position, and input 227 for moving the transfer-switch mechanism 218 to the "isolated" position.

In an example configuration, in response to receiving the input to close emergency source contacts (e.g., input 223), the transfer-switch mechanism 218 will open the normal contacts (e.g., first main switch contacts 253 shown in FIG. 6A) and then close the emergency contacts (e.g., second main switch contacts 254 shown in FIG. 6A). Further, in response to receiving an input to close normal source contacts (e.g., input 221), the transfer-switch mechanism 218 will open "emergency" source contacts and then close "normal" source contacts. Still further, in response to receiving an input to open both sources (e.g., input 222), the transfer-switch mechanism 218 will open either "normal" or "emergency" closed source contacts and disconnect the load 252 from both sources 250, 251.

In an example embodiment, in addition to the six functions described with respect to FIG. 16, the switch 200 further includes additional sensing and control functions preventing either transfer switch module 201, 202 from closing on the opposite source. In particular, in accordance with an example embodiment, one module cannot close "emergency" contacts if the other module is closed on "normal" contacts. For instance, ATS 201 is unable to close "emergency" contacts if ATS 202 is closed on "normal" contacts. Further, one module cannot close "normal" contacts if the other module is closed on "emergency" contacts. For instance, ATS 201 is unable to close "normal" contacts if ATS 202 is closed on "emergency" contacts. Still further, one module cannot open both "emergency" and "normal" contacts if the other module "emergency" and "normal" contacts are open. For instance, ATS 201 is unable to open both "emergency" and "normal" contacts if ATS 202 "emergency" and "normal" contacts are open As mentioned above, conventional bypass-isolation switches typically require three steps to rack-out the automatic transfer-switch mechanism. The motorized rack-out autonomous redundant switch in accordance with the present disclosure beneficially improves this process. For instance, the disclosed motorized rack-out switch may rack-out the automatic switch mechanism with a single step: inputting the "isolated" command (e.g., input 227) on the control panel 207a. In response to receiving the input 227 to move a selected ATS to the "isolated" position, the controller 207 automatically (i) determines respective positions of the first ATS and the second ATS, (ii) causes the respective transfer-switch mechanisms of the first ATS and the second ATS to each operate in an appropriate mode for isolating the selected ATS, and (iii) cause the motorized rack-out mechanism of the selected ATS to move the transfer-switch mechanism of the selected ATS to the isolated position. For instance, the controller 207 may automatically (i) evaluate available sources, (ii) determine positions of each transfer switch module 201 and 202, (iii) transfer each switch module 201 and 202 as appropriate, and then (iv) use the powered actuator to move the selected ATS to the "isolated" position. This involves less user action and, thus, the disclosed systems and methods simplify the process of operating a bypass-isolation switch.

In another example, a user can select input 226 to automatically move a selected ATS to the "test" position. In response to receiving the input 226 to move a selected ATS to the "test" position, the controller 207 may automatically (i) evaluate available sources, (ii) determine positions of each transfer switch module 201 and 202, (iii) transfer each switch module 201 and 202 as appropriate, and then (iv) use the powered actuator to move the selected ATS to the "test" position.

In yet another example, a user can select input 225 to automatically move a selected ATS to the "connected" position. In particular, in response to receiving the input 225 to move a selected ATS to the "connected" position, the controller 207 may automatically (i) evaluate available sources, (ii) determine positions of each transfer switch module 201 and 202, (iii) transfer each switch module 201 and 202 as appropriate, and then (iv) use the powered actuator to move the selected ATS to the "connected" position.

In an example embodiment, the disclosed systems may operate in an autonomous mode without any user input. In an example control scheme, the automatic isolation autonomous redundant switch 200 may function autonomously controlling both transfer functions and isolation rack-out functions without any user input. For instance, in an autonomous mode, the switch is configured to transfer by itself to the appropriate source of power, then disconnect and/or reconnect to an electrical bus without receiving any user input. In such scheme, it is possible to automatically bypass one of the transfer switch modules 201, 202, and isolate it from the interconnecting bus 203 by moving it from the "connected" position to either the "test" position or the "isolated" position by means of the powered actuator 211.

Figure 17:
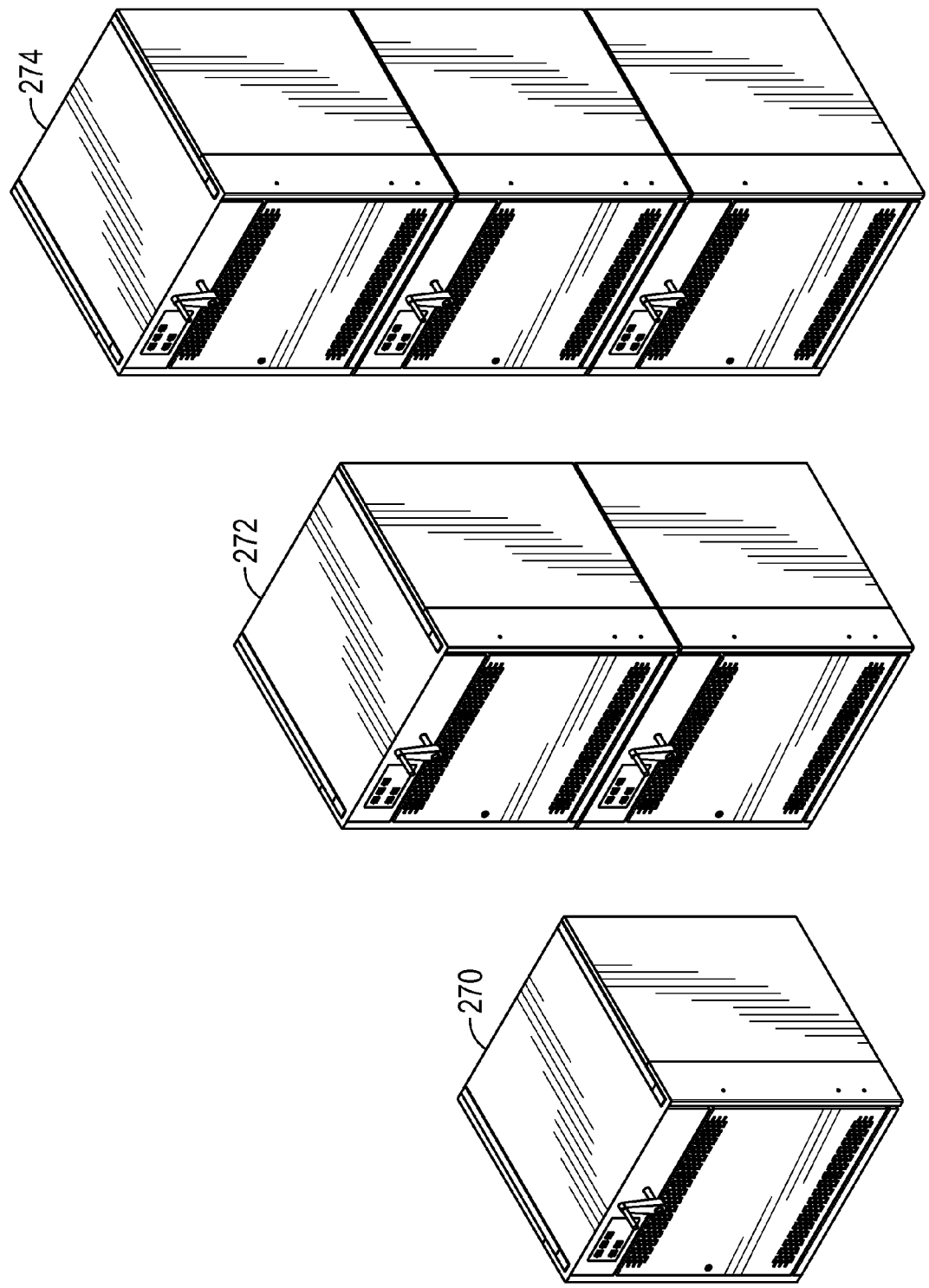
FIG. 17 depicts perspective views of other example possible configurations utilizing one or more switch modules, according to an example embodiment of the present disclosure.

In an example embodiment, a single transfer switch module with an actuator driven rack-out mechanism is provided. For instance, FIG. 17 illustrates a single ATS module configuration 270. In other examples, a plurality of transfer switch modules each with an actuator driven rack-out mechanism are provided. For instance, FIG. 17 illustrates a dual ATS module configuration 272 and triple ATS module configuration 274. Other configurations are possible as well.

In accordance with an example embodiment, the disclosed automatic autonomous redundant switch 200 may provide for automatic failover and redundant switching. For instance, the at least one controller 207 may automatically detect a malfunction (e.g., failure) of a switch (e.g., ATS 201 or ATS 202) through various means to initiate a failover sequence. For example, the controller 207 may detect a failure condition in an ATS (e.g., ATS 201 or ATS 202) and, in response to detecting the failure condition, automatically complete a failover sequence to move the transfer-switch mechanism of the failed ATS (e.g., ATS 201 or ATS 202) to the isolated position and connect the other ATS (e.g., ATS 202 or ATS 201) to the first power source 250 or the second power source 251 (see FIG. 6A). In an example embodiment, the failover sequence for ATS equipment where the dynamic steps to isolate the problematic device and regain full operation using a secondary switch occurs automatically. Further, in an example embodiment, two switches in a single enclosure serve as an N+1 redundant system that can automatically initiate steps to failover the secondary switch.

Figure 18:
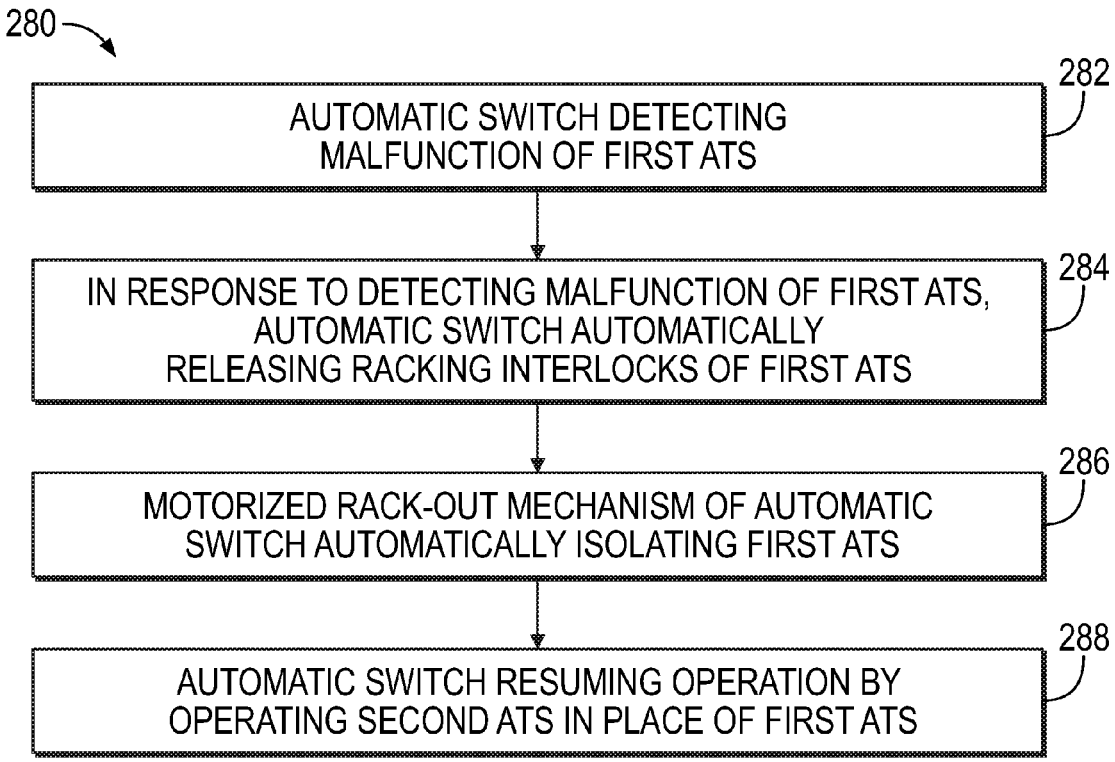
FIG. 18 is a flow chart depicting functions that can be carried out in accordance with an example method.
Figure 19A:
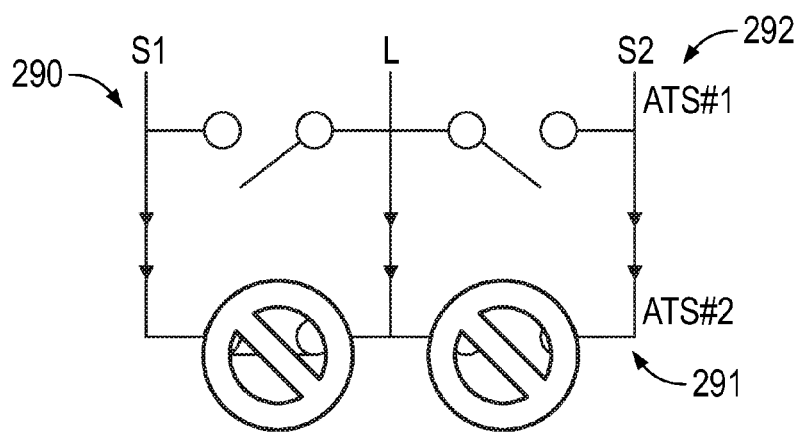
FIGS. 19A-D depict example interconnection schematics for an example failover sequence, according to an example embodiment of the present disclosure.
Figure 19B:
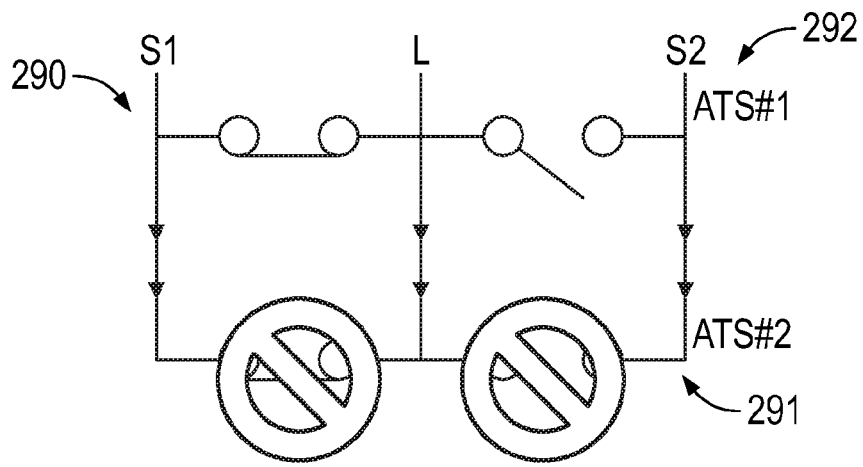
Figure 19C:
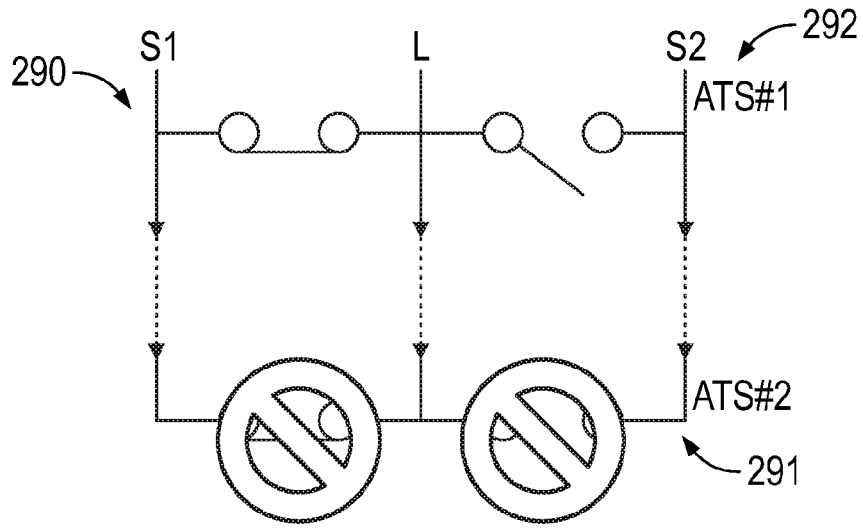
Figure 19D:
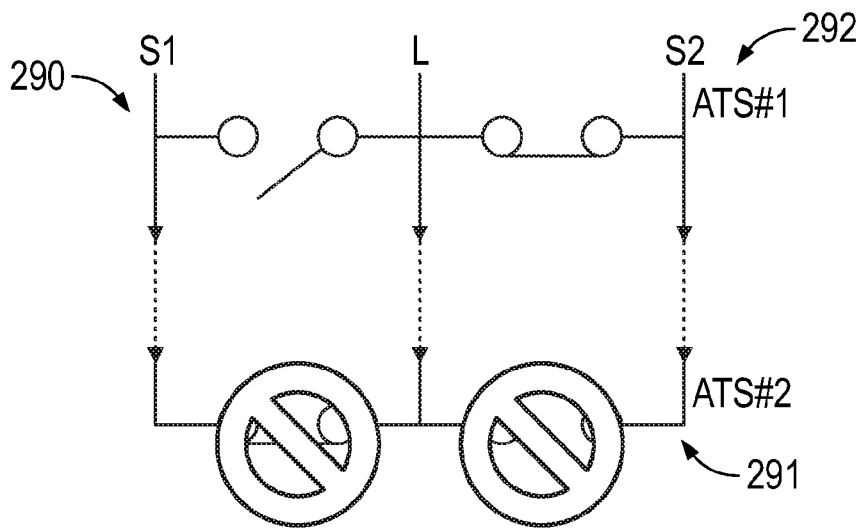

An example method for automatic failover and redundant switching is described in further detail with reference to FIGS. 18 and 19a-d. In particular, FIG. 18 is a flow chart depicting functions that can be carried out in accordance with an embodiment of an example method. The method 280 of FIG. 18 provides for improved ATS controls and, in particular, for automatic failover and redundant switching.

As shown in FIG. 18, at block 282, the method involves an automatic autonomous redundant switch 200 detecting a malfunction of a first ATS 201. The method then involves, at block 284, in response to detecting the malfunction of the first ATS, the automatic switch automatically releasing racking interlocks of the first ATS. The method then involves, at block 286, a motorized rack-out mechanism of the automatic switch automatically isolating the first ATS. Further, the method involves, at block 288, the automatic switch resuming operation by operating a second ATS 202 in place of the first ATS 201. In an example embodiment, these functions of method 280 could be carried out by an automatic autonomous redundant switch such as the automatic autonomous redundant switch 200 illustrated in FIG. 5.

At block 282, the automatic switch detects a malfunction of a first ATS. This step is further described with reference to FIG. 19a. Automatic switch 290 uses timing and/or diagnostic signals retrieved from the primary switching device (e.g., ATS 291) during operation of the equipment or during idle time, and the electronic controls can determine if a malfunction has occurred that has compromised the primary switch 291. When malfunction conditions are present or detected, the failover sequence is initiated. In an example embodiment, the transfer-switch controller of automatic switch 290 may detect mechanical and/or electrical failures within the switching equipment based upon diagnostic signals and/or the failure of the switch to operate in a timely matter. With this information, the controller of automatic switch 290 may automatically initiate a failover sequence to isolate the failed primary switching device 291 and continue operation using the secondary switch 292.

At block 284, in response to detecting the malfunction of primary switching device 291, the automatic switch automatically releases racking interlocks of the primary switching device 291. This step is further described with reference to FIG. 19b. The first action of the failover sequence would be to release the racking interlocks of the primary switching device 291. This may be accomplished by paralleling the secondary switch 292 with the primary or other electrical or mechanical means. The interlocks are used to prevent the dangerous paralleling of two separate power sources and to prevent racking when electrical currents do not have an alternative path. By paralleling the secondary switch 292 the currents will have an alternate path and allow the primary switching device 291 to be racked-out to a disconnect position.

At block 286, a motorized rack-out mechanism of the automatic switch 290 automatically isolates the primary switching device 291. This step is further described with reference to FIG. 19c. The failed primary switching device 291 may now be isolated from the remainder of the electrical equipment to allow full operation of the secondary switch 292 and avoid further complication. The isolation of the failed switch 291 may, for example, be accomplished by one of two means. For example, on an ATS with motorized racking, the controls may automatically begin the racking operation using an equipped motor. As another example, on an ATS with manual isolation switches, the controls may issue a prompt requesting a user operate the manual racking handle.

At block 288, in response to isolating the primary switching device 291, the automatic switch 290 resumes operation by operating the secondary switch 292 in place of the primary switching device 291. This step is further described with reference to FIG. 19d. Once the primary switching device 291 is isolated, the controls may than freely operate the secondary switch 292 as it would have the primary switching device 291. This returns the equipment operability while the failed switch 291 can be serviced or repaired without the need for a system 290 shutdown.

Figure 20:
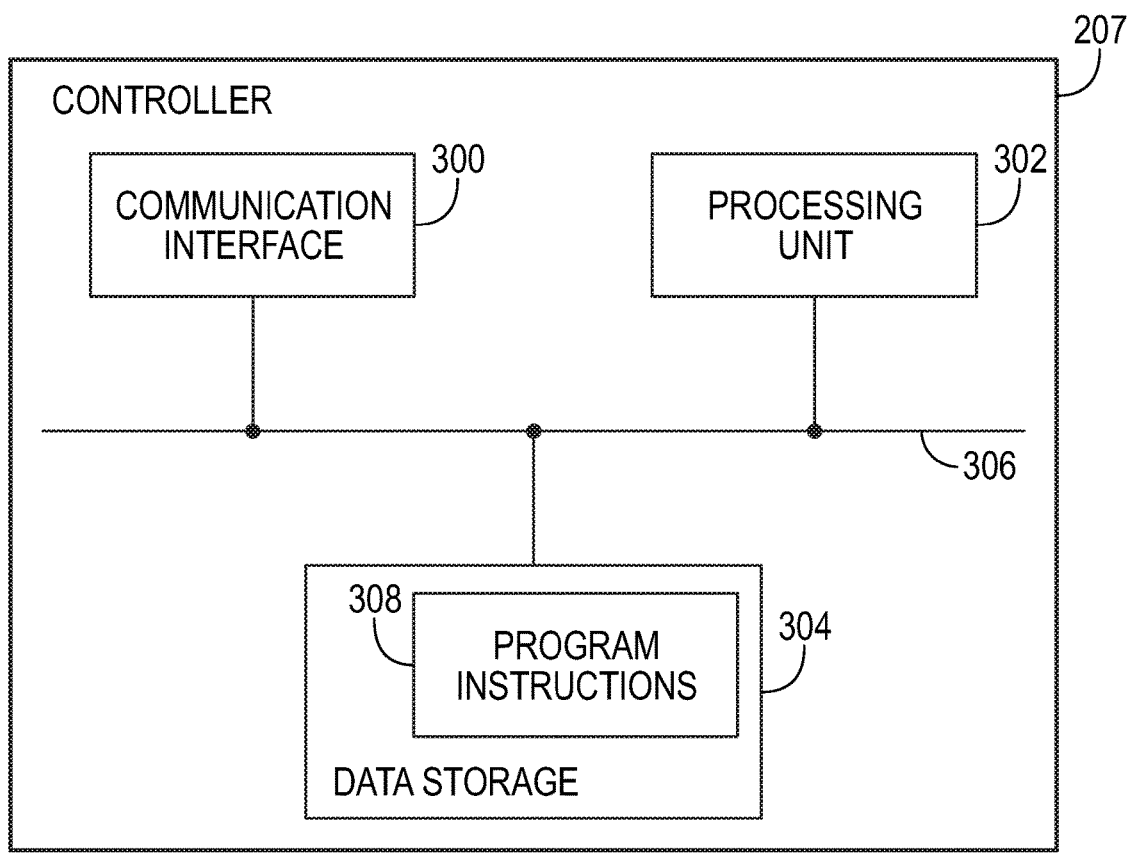
FIG. 20 is a simplified block diagram of a controller operable in an automatic autonomous redundant switch, such as the automatic switch depicted in FIG. 5, according to an example embodiment of the present disclosure.

As mentioned above, automatic autonomous redundant switch 200 includes at least one controller 207 configured to control the operation of the first ATS 201 and the second ATS 202. FIG. 20 is a simplified block diagram of the at least one controller 207 showing some of the physical components that such a controller may include. As shown in FIG. 20, the controller 207 includes a communication interface 300, a processing unit 302, and data storage 304, all of which may be communicatively linked together by a system bus, network, or other connection mechanism 306. With this arrangement, the communication interface 300 may function to provide for communication with various other network elements and may thus take various forms, allowing for wired and/or wireless communication for instance. Processing unit 302 may then comprise one or more general purpose processors (e.g., microprocessors) and/or one or more special purpose processors (e.g., application specific integrated circuits) and may be integrated in whole or in part with the network communication interface. And data storage 304 may comprise one or more volatile and/or non-volatile storage components, such as optical, magnetic, or flash memory and may be integrated in whole or in part with the processing unit. As shown, by way of example, data storage 304 may then comprise program instructions 308, which may be executable by processing unit 302 to carry out various functions described herein.

In an exemplary embodiment, data storage 304 may include program instructions that are executable to cause the ATS 201 and/or ATS 202 to perform functions described above. For instance, data storage 304 may include program instructions that are executable to cause the ATS 201 or 202 to perform functions comprising: (i) close normal source contacts (e.g., in response to receiving input 221); (ii) close emergency source contacts (e.g., in response to receiving input 223); (iii) open both sources (e.g., in response to receiving input 222); (iv) move transfer-switch mechanism to "connected" position (e.g., in response to receiving input 225); (v) move transfer-switch mechanism to "test" position (e.g., in response to receiving input 226); and (vi) move transfer-switch mechanism to "isolated" position (e.g., in response to receiving input 227). As another example, data storage 304 may include program instructions that are executable to cause the ATS 201 and/or ATS 202 to perform functions comprising the automatic failover and redundant switching functions discussed above.

Although the transfer switches described here are referred to as automatic transfer switches, the disclosed systems and method may apply to any suitable electric power switching transfer switch. Aspects of the present disclosure may be equally applicable in other scenarios as well. For example, aspects of the systems and methods of the present disclosure are applicable to circuit breakers. Other examples are possible as well.

3. Example Benefits of the Disclosed Systems and Methods

As described above, the proposed methods and systems beneficially provide an improved automatic autonomous redundant switch and improved methods for operating such an automatic switch. For instance, the disclosed systems and methods provide ability to automatically transfer electrical loads and isolate and reconnect each ATS module from an electrical bus. Further, the disclosed systems and method provide a simplified way to control operation of an ATS, including a simplified way to control the transfer-switch mechanism of the ATS and to control the rack-out mechanism of the ATS. Still further, the disclosed systems and method allow for controlling operation of the ATS both locally and remotely. Yet still further, disclosed systems and methods allow for autonomous control of the ATS without user input. And yet still further, in contrast to a standard bypass isolation switch, the disclosed systems and method allow for fully controlling and operating the bypass (e.g., the top) switch as a source seeking transfer device. For these reasons and the reasons described throughout the disclosure, the disclosed methods and systems can help improve the operation and maintenance of a transfer switch system.

4. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An automatic switch configured to provide energy from either a first power source or a second power source to a load, the automatic switch comprising:
   a first automatic transfer switch (ATS);
   a second ATS;
   an interconnecting bus configured to connect the first ATS and the second ATS; and
   at least one controller configured to control the operation of the first ATS and the second ATS,
   wherein the first ATS and the second ATS each include:
      a respective transfer-switch mechanism;
      a respective bus attachment configured to connect to the interconnecting bus; and
      a respective motorized rack-out mechanism having a powered actuator, wherein the respective motorized rack-out mechanism is configured to move the respective transfer-switch mechanism between (i) a connected position in which the respective bus attachment is connected to the respective transfer-switch mechanism and (ii) an isolated position in which the respective bus attachment is isolated from the respective transfer-switch mechanism,
   wherein the first ATS is connected to the first power source or the second power source, and wherein the controller is further configured to:
      detect a failure condition in the first ATS; and in response to detecting the failure condition, automatically complete a failover sequence to move the transfer-switch mechanism of the first ATS to the isolated position and connect the second ATS to the first power source or the second power source.

2. The automatic switch of claim 1, wherein the respective motorized rack-out mechanism is further configured to move the respective transfer-switch mechanism to a test position between the connected position and the isolated position.

3. The automatic switch of claim 2, wherein the respective transfer-switch mechanism comprises a respective first main switch configured to connect the first power source to the load upon closing of the respective first main switch and (ii) a respective second main switch configured to connect the second power source to the load upon closing of the respective second main switch, and
wherein the respective transfer-switch mechanism is configured to operate (i) in a first mode in which the respective first main switch is closed, (ii) in a second mode in which the respective second main switch is closed, and (iii) in a third mode in which both the respective first main switch and the respective second main switch are open.

4. The automatic switch of claim 1, wherein the respective transfer-switch mechanism comprises a plurality of isolation connectors, and wherein the respective bus attachment comprises a corresponding plurality of bus stab structures.

5. The automatic switch of claim 1, wherein the respective powered actuator is selected from the group consisting of a hydraulic actuator, a pneumatic actuator, an electric actuator, and a stored-energy actuator.

6. The automatic switch of claim 1, wherein the first ATS and the second ATS each include a respective manual actuator.

7. The automatic switch of claim 1, wherein the at least one controller is further configured to:
receive an input to isolate a selected ATS of the first ATS and the second ATS; and
in response to receiving the input to isolate the selected ATS, (i) determine respective positions of the first ATS and the second ATS, (ii) cause the respective transfer-switch mechanisms of the first ATS and the second ATS to each operate in an appropriate mode for isolating the selected ATS, and (iii) cause the motorized rack-out mechanism of the selected ATS to move the transfer-switch mechanism of the selected ATS to the isolated position.

8. The automatic switch of claim 1, wherein the controller is further configured to:
detect a failure condition in the second ATS; and
in response to detecting the failure condition, automatically complete a failover sequence to move the transfer-switch mechanism of the second ATS to the isolated position and connect the first ATS to the first power source or the second power source.

9. The automatic switch of claim 1, wherein controlling the operation of the first ATS and the second ATS comprises:
for each ATS, controlling an operation mode of the respective transfer-switch mechanism and controlling a position of the respective motorized rack-out mechanism.

10. The automatic switch of claim 1, wherein the at least one controller configured to control the operation of the first ATS and the second ATS comprises:
a first controller for the first ATS; and
a second controller for the second ATS.

11. The automatic switch of claim 10, wherein the first and second controllers each comprise a respective control panel, wherein the respective control panel comprises (i) at least one respective user input for automatically controlling an operation mode of the respective transfer-switch mechanism and (ii) at least one respective user input for automatically controlling a position of the respective rack-out mechanism.

12. The automatic switch of claim 11, wherein the at least one respective user input for automatically controlling an operation mode of the respective transfer-switch mechanism comprises an input for closing respective first main switch contacts, an input for closing respective second main switch contacts, and an input for opening the respective first main switch contacts and the respective second main switch contacts.

13. The automatic switch of claim 11, wherein the at least one respective user input for automatically controlling a position of the respective rack-out mechanism comprises an input to move the respective transfer-switch mechanism to a connected position, an input to move the respective transfer-switch mechanism to a test position, and an input to move the respective transfer-switch mechanism to an isolated position.

14. A method for automatic failover and redundant switching, the method comprising:
an automatic switch detecting a malfunction of a first automatic transfer switch (ATS), wherein the automatic switch comprises the first ATS, a second ATS, a motorized rack-out mechanism, and an interconnecting bus configured to connect the first ATS and the second ATS;
in response to detecting the malfunction of the first ATS, the automatic switch automatically releasing racking interlocks of the first ATS and the motorized rack-out mechanism of the automatic switch automatically moving the first ATS to an isolated position in which a bus attachment of the first ATS configured to connect to the interconnecting bus is isolated from a transfer-switch mechanism of the first ATS; and
the automatic switch resuming operation by operating the second ATS in place of the first ATS.

* * * * *